(12) United States Patent
Ramani et al.

(10) Patent No.: US 9,811,261 B1
(45) Date of Patent: Nov. 7, 2017

(54) DYNAMIC BUFFER SIZE

(71) Applicant: Amazon Technologies, Inc., Seattle, WA (US)

(72) Inventors: Ishwar VenkataManikanda Ramani, San Jose, CA (US); Michael Wendling, Woodside, CA (US); Mridula Karumuru, Milpitas, CA (US); James Robert Wright, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 54 days.

(21) Appl. No.: 14/852,603

(22) Filed: Sep. 13, 2015

(51) Int. Cl.
*G06F 12/00* (2006.01)
*G06F 3/06* (2006.01)

(52) U.S. Cl.
CPC .......... *G06F 3/0608* (2013.01); *G06F 3/0631* (2013.01); *G06F 3/0673* (2013.01)

(58) Field of Classification Search
CPC ...... G06F 3/0652; G06F 3/067; G06F 3/0631; G06F 12/023
USPC ......................................................... 711/154
See application file for complete search history.

(56) References Cited

U.S. PATENT DOCUMENTS

| | | | |
|---|---|---|---|
| 6,164,169 A | 12/2000 | Goff | |
| 6,553,476 B1* | 4/2003 | Ayaki | G06F 3/0601 386/E5.042 |
| 7,661,032 B2* | 2/2010 | Eberbach | G06F 11/008 707/686 |
| 9,127,942 B1 | 9/2015 | Haskin et al. | |
| 2004/0044698 A1* | 3/2004 | Ebata | G06F 3/0608 |
| 2006/0095401 A1* | 5/2006 | Krikorian | H04N 21/4398 |
| 2009/0132453 A1* | 5/2009 | Hangartner | G06F 17/30053 706/46 |
| 2009/0187284 A1* | 7/2009 | Kreiss | G06Q 50/06 700/291 |
| 2011/0035535 A1* | 2/2011 | Locasio | G11C 16/349 711/103 |
| 2011/0185117 A1* | 7/2011 | Beeston | G06F 12/084 711/111 |
| 2012/0173594 A1* | 7/2012 | Jogand-Coulomb | G06F 17/30147 707/812 |
| 2013/0179624 A1* | 7/2013 | Lambert | G06F 12/0246 711/103 |
| 2014/0358833 A1* | 12/2014 | Biem | G06N 5/046 706/21 |
| 2015/0324137 A1* | 11/2015 | Wu | G06F 3/0619 713/2 |

* cited by examiner

*Primary Examiner* — Tuan Thai
*Assistant Examiner* — Tasnima Matin
(74) *Attorney, Agent, or Firm* — Lowenstein Sandler LLP

(57) ABSTRACT

A processing device determines configuration data associated with a device. The processing device analyzes the configuration data with respect to storage usage data collected over a previous time period. The processing device determines a maximum amount of storage space of a storage component for the device that is predicted to be written to in a future time period. The processing device determines a free space buffer threshold for a free space buffer of the storage component to be greater than the maximum amount of storage space that is predicted to be written to in the future time period.

20 Claims, 21 Drawing Sheets

DYNAMIC BUFFER SIZE

BACKGROUND

Storage space is an important issue for mobile devices and other resource constrained devices. Mobile devices, which have a variety of storage sizes and capabilities, are increasingly being used for consumption of electronic content. A typical user may download individual content items as the user wishes to consume the content items. Often, digital devices have available storage space to store additional pieces of content after the user spends time searching for and downloading those that match the user's personal preferences. Embodiments discuss here provide technical solutions to problems introduced by these computer systems.

BRIEF DESCRIPTION OF THE DRAWINGS

The embodiments described herein will be understood more fully from the detailed description given below and from the accompanying drawings. The drawings should not be taken to limit the application to the specific embodiments, but are for explanation and understanding only.

DETAILED DESCRIPTION

Figure 1:
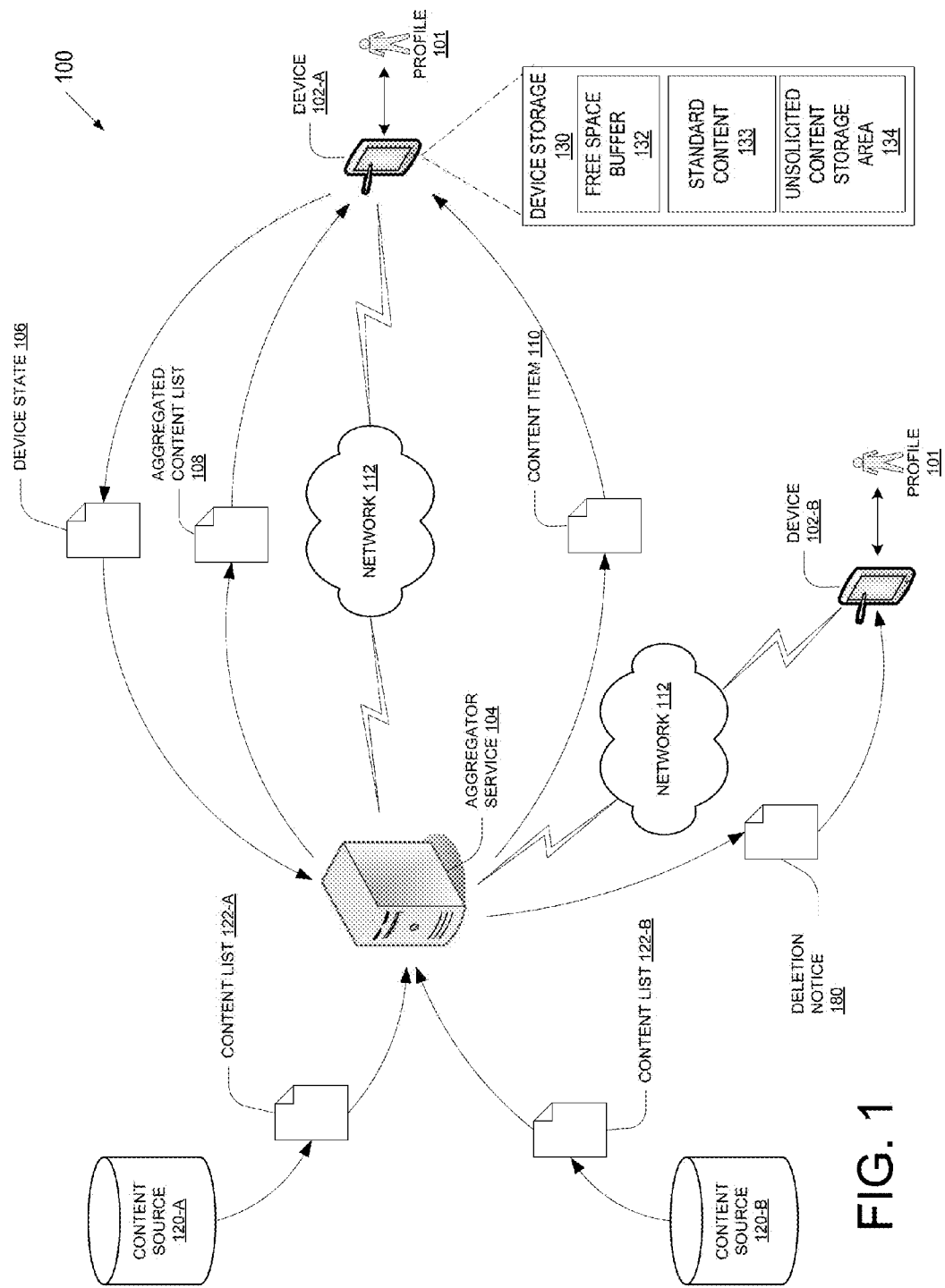
FIG. 1 is a schematic diagram of an example network architecture showing an example exchange between an aggregator service and a device, in accordance with one embodiment of the present invention.

Devices may incorporate a large amount of available storage space that can remain unused until a user actively downloads content. Embodiments provide a system for determining content items that a user is likely to be interested in and preloading the content items (referred to as unsolicited content items) onto a device associated with a user account or profile of the user. Preloading content items onto a device may increase a user experience by reducing an amount of time that a user waits to begin consuming the content items. Additionally, the user may access and consume the preloaded content items even when the device lacks network access.

Preloading of content onto a device presents numerous challenges. For example, preloaded content may or may not be relevant to a user that uses a device. Thus, a storage space of a device may be filled with content that is not of interest to a user. Additionally, loading too much content onto a device may reduce free space to a point where the performance of the device can be impacted. This may cause an operating system to alert the user to delete content manually, which degrades a user experience.

Embodiments described herein provide an unsolicited content manager that can manage unsolicited content that was preloaded onto a device. The unsolicited content manager interfaces with a download manager to cause the download manager to download the unsolicited content items into an unsolicited content storage area, and maintains a free space buffer that is sized to ensure that there is enough available storage space (after the unsolicited content storage area is filled) to enable a user to download desired content. The unsolicited content storage area represents a first area of a storage component of the device and the free space buffer represents a second area of the storage component. The unsolicited content manager may then begin sending instructions to the storage component to delete the unsolicited preloaded content from the unsolicited content storage area to maintain the free space buffer as solicited content and other content is added to the storage component. Thus, the free space buffer may enable the unsolicited content manager to automatically have unsolicited content removed from the unsolicited content storage area while the device is in use without impacting performance or user experience.

To determine a free space buffer size, the unsolicited content manager may identify configuration data associated with a device. This configuration data may include information describing the capabilities of the device (e.g., default write and delete speeds of a storage component) and/or default operating system settings. The unsolicited content manager may compare the configuration data to storage usage data collected over a period of time by a storage monitor, and subsequently determine a maximum amount of storage space that the device can be expected to consume in a future time period based on previous activity and/or storage component status. The storage usage data may include an observed write speed observed over the period of time. The unsolicited content manager may then set a free space buffer threshold for the free space buffer of the device to account for the maximum amount of storage space that the device can be expected to consume in the future time period. Thus, the unsolicited content manager may maintain a level of free space on the device to accommodate user downloaded content and other content while minimizing any degradation of device performance while the user either consumes the content downloaded, or downloads additional content.

Further embodiments herein provide an aggregator service that can curate content from multiple sources, proactively generate lists of unsolicited content for a user profile of a user based on user preferences and device capabilities, and manage unsolicited content for the user profile across multiple devices that share the user profile. The aggregator service can receive information describing the state of unsolicited content stored on a device associated with a user profile. The aggregator service may then curate content from multiple source providers based on known user preferences and available free space on a device, and send the curated list to the device for subsequent download. Additionally, the aggregator service may use the information describing the state of the unsolicited content on the device to determine whether the same unsolicited content is stored on other devices associated with the same user profile, and subsequently instruct the other devices to remove that unsolicited content based on user activity on the device. Thus, unsolicited content may be seamlessly managed for a user profile across all of the devices associated with that user profile.

FIG. 1 is a schematic diagram depicting an illustrative network architecture 100 showing an example exchange between an aggregator service 104 and a device 102, in accordance with embodiments of the disclosure. The network architecture 100 may include one or more devices 102 (e.g., devices 102-A, 102-B) associated with a profile 101, and connected to the aggregator service 104 via one or more networks 112. While various illustrative components of the network architecture 100 may be described herein in the singular, it should be appreciated that multiple ones of any such components may be provided in various example embodiments of the disclosure.

The device 102 may be a mobile computing device such as an electronic book reader, tablet computer, cellular telephone, personal digital assistant (PDAs), portable media player, netbook, laptop computer, portable gaming console, motor vehicle (e.g., automobiles), wearable device (e.g., smart watch), removable storage device, and so on. The device 102 may also be a traditionally non-portable computing device such as a television set top box, a smart television, a desktop computer, a backup storage device, an edge server, a wireless router, and/or any other device that can store user content and/or other data. Device 102 may be configured with functionality to enable consumption of one or more types of electronic content. For example, device 102 may receive electronic content items, including data representing e-books, movies, television shows, photographs, periodicals, etc. from a service provider system such as aggregator service 104. Device 102-A device 102-B may be different types of devices that are capable of consuming different types of electronic content. For example, device 102-A may be a television set top device, and device 102-B may be an electronic reader.

In some embodiments, devices 102 may be associated with a single user profile and a single user account. For example, devices 102-A and 102-B may be associated with the same user profile (referred to herein simply as profile 101). The profile 101 defines the attributes, properties, behaviors, and preferences of a user and may include an email address associated with a user, a username, password, user preferences, metadata indicating past activity associated with the profile (e.g., past purchases, past consumption of content items, past sharing behavior, and so on), etc. The user account may define account properties associated with a particular profile 101 or with multiple profiles that are grouped (e.g., profiles of family members in a family). The user account may include financial payment information, an address to ship purchases to, a list of devices 102, a list of profiles associated with the user account, and so on.

In some embodiments, devices 102 may be associated with multiple profiles, all of which may be associated with a common user account. For example, devices 102 may be associated with profile 101 as well as an additional profile (not pictured). In a further example, a family may include a mom, a dad and a child, and the family may share a single user account that is associated with device 102-A and device 102-B. The user account may additionally be associated with a first profile for the mom, a second profile for the dad and a third profile for the child. The profile for the child may have certain content restrictions (e.g., no adult content can be displayed when the child is logged into the child profile). Additionally, the child profile may include time limits on the amount of non-educational content that can be consumed. The account's purchasing privileges and/or data may be restricted to certain profiles (e.g., to the mom's profile and the dad's profile) or need authorization from certain profiles.

Multiple devices 102-A and 102-B may share the same profile 101 (or profiles). A profile is shared by multiple devices if those devices are each associated with a user account that includes that profile. Thus, a user associated with the profile may own and use any of the devices that are indicated in the user account.

A device 102 may display, play or otherwise output electronic content (e.g., to enable a user to read, view, listen to, or otherwise consume the content. The term content as used herein refers to any publication (e.g., any written work), video, audio, application (app), game or other media item stored in a digital format. Examples of electronic content include electronic publications (e.g., electronic versions of written works such as electronic books (e-books), electronic newspapers, electronic periodicals, electronic textbooks, electronic journals, electronic magazines, etc.), videos (e.g., music videos, video documentaries, movies, episodes of television series), and so forth. Other examples of content include digital audio books, real simple syndication (RSS) feeds, computer games, applications ("apps") installed on device 102, and so forth.

Content may be stored on the device 102-A in a device storage 130. Device storage 130 may include a free space buffer 132 (e.g., storage space on device 102-A that is not used for unsolicited content), standard content 133 and designated unsolicited content storage area (referred to simply as unsolicited content storage area 134). Standard content 133 may include operating system files, downloaded apps, user generated content, and/or other downloaded content.

The unsolicited content storage area 134 represents the portion of device storage 130 that is filled with unsolicited content that has been preloaded onto the devices 102. Unsolicited electronic content is content such as movies, ebooks, music albums or songs, etc. that are identified by the unsolicited content manager as being of likely interest to a user and that has been downloaded onto the device and stored in the unsolicited content storage area 134. Unsolicited content may be downloaded and stored in the unsolicited content area 134 without the devices 102 first receiving a download request from a user, or from an application running at an application layer on the devices 102. Free space buffer 132 may be managed dynamically by components of devices 102 in order to optimize adding and deleting unsolicited content items to and from unsolicited content storage area 134 without impacting performance of devices 102.

In embodiments, unsolicited content may be deleted from unsolicited content storage area 134 responsive to other content being added to standard content 133. Standard content 133 includes all content other than unsolicited content. Examples of standard content 133 include podcast data or feed data from podcasts or feeds that a user profile has subscribed to, content that a user has explicitly requested to be downloaded, incoming emails and other messages, and so on. Unsolicited content manager may reduce a size of the unsolicited content storage area 134 and delete unsolicited content responsive to any such additions to standard content (e.g., when an email is received, data is received from a feed, a user requests download of content, and so on).

Free space buffer 132 may be managed so that an application may add content to, or delete content from, the standard content 133 without regard to the contents of unsolicited content storage area 134. For example, if a camera application that can capture and store bursts of high resolution photos to standard content 133 in a short period of time is executed, free space buffer 132 may be increased dynamically to accommodate the expected storage needs of the application. Thus, a user or application does not need to take any affirmative action to remove content items from unsolicited content storage area 134 to make room for content items in standard content 133. Accordingly, the existence of the unsolicited content storage area 134 and the unsolicited content is transparent to a user and to applications running on devices 102.

Devices 102 can receive electronic content, search results, upgrades, and/or other information from aggregator service 104 via the network 112. For example, device 102-A may download or receive e-books, movies, television shows, etc. from the aggregator service 104 (e.g., one or more content items 110). Additionally, device 102-A may receive lists of content for a profile 101 (e.g., aggregated content list 108 for a user profile), notifications from aggregator service to remove content, or other similar information. Aggregator service 104 may receive various requests (e.g., requests for content), profile or device related information (e.g., device state 106), or similar information from device 102-A via network 112.

Aggregator service 104 corresponds to any functionality or combination of functionality for providing lists of unsolicited content to one or more devices 102. Aggregator service 104 can be a component of network-accessible server-based functionality (e.g., a media server), various data stores, and/or other data processing equipment. Aggregator service 104 may be a component of one or more machines (e.g., one or more server computer systems, routers, gateways, etc.) that have processing and storage capabilities to provide server-based functionality.

In one embodiment, aggregator service 104 may communicate with one or more content sources 120 (e.g., content sources 120-A, 120-B). Content sources 120 may correspond to any source of electronic content (e.g., video, audio, e-books, periodicals, etc.). Aggregator service 104 may obtain ranked lists of content for profile 101 based on the type of content stored in content sources 120. The ranked lists may be lists of curated content that has been selected by the content source for the user profile 101 based on data from the user profile 101 and/or additional data that the content sources 120 have about the user profile 101. Based on such data about the user profile 101, each content source may sift through available content items, select specific content items, and then rank those specific content items. Higher ranked content items may be determined by the content source 120 to be of greater interest to a user associated with the user profile. Each content list may include a content type (e.g., movie, ebook, song, etc.) of items on the content list, titles of the content items, identifications (e.g., standard identification numbers) of the content items, an identifier of the content source, and/or other information.

For example, content source 120-A may store video content, and may provide a list of ranked video content items for profile 101 in content list 122-A to aggregator service 104. Similarly, content source 120-B may store audio content, and may provide a list of ranked audio items for the profile 101 in content list 122-B to aggregator service 104. In some embodiments, content lists 122 may be stacked ranked lists for profile 101 associated with device 102-A. For example, content list 122-A may be a list of video content items ranked in a stacked order based on preferences associated with profile 101 (e.g., if the user prefers television shows to movies, content items of television shows may be presented higher on the list).

According to one or more embodiments, as profile 101 consumes electronic content on the device 102, data about interactions with the electronic content may be recorded. Each user device 102 may be associated with a particular profile (e.g., profile 101). In other embodiments, each user device 102 may be associated with multiple user profiles. Thus, as an electronic work is consumed on a device by a particular profile, interactions with the electronic work are associated with that particular profile.

In one embodiment, device 102-A may be configured to send device state information in device state 106 to aggregator service 104. The device state information may be sent when device 102-A starts, when device 102-A is idle and charging, or at any other time. Device state 106 may include information describing the particular hardware characteristics of device 102-A (e.g., memory speed, free space available on the device, etc.). Device state 106 may also include information about profile 101 associated with the device (e.g., information identifying the user, the unsolicited electronic content items stored on the device for the profile, the electronic content items specifically requested by the profile (e.g., solicited by the profile), whether content items have been viewed, etc.).

The device state 106 may additionally include a current free space on one or more storage components of device 102-A. The free space may represent an amount of free space on one particular storage component of the device 102-A. Alternatively, the free space may represent a combined free space across multiple storage components of the device 102-A (e.g., across an embedded solid state drive and an inserted memory card). Additionally or alternatively, a separate free storage space may be reported for each storage component of device 102-A. The free space may have been determined by the unsolicited content manager on the device 102-A based on an amount of storage occupied by standard content 133 and a remaining amount of storage not occupied by the standard content. The free storage space may also include an available free storage space. The available free storage space represents an amount of free storage space that remains after an amount of unsolicited content in the storage is added to the amount of standard content. Thus, the available free space may include an amount of storage that is available after subtracting an amount of storage occupied by the standard content 133 and an amount of storage occupied by unsolicited content. The unsolicited content manager may additionally determine a write speed of the storage component (e.g., a default write speed and/or an observed write speed) and/or a delete speed of the storage component, and may increase or reduce a value of the available free space based on the write speed and/or delete speed.

The device state may additionally identify previous activity associated with the storage component(s) of the device 102-A and/or unsolicited content items. The previous activity may identify past write speeds (e.g., amount of data written in a time period such as Megabytes written per minute) and/or past delete speeds. The previous activity may identify unsolicited content items that have been accessed on the device 102-A, an amount of the unsolicited content items that were presented, and/or unsolicited content items that have been deleted from the device 102-A.

The device state 106 may also include a request for additional electronic content items (solicited or unsolicited). In some embodiments, the request for additional content can be an explicit request for particular content items, or a particular type of content (e.g., audio vs. video). Alternatively, the request may include the amount of free space on the device that may be occupied by electronic content which may be interpreted by the aggregator service 104 as a request to provide content if there is sufficient free space to accommodate a new unsolicited content item. Aggregator service 104 may then create an aggregated content list 108 using items from content lists 122-A and 122-B, and send the aggregated content list 108 to device 102-A, which may subsequently download the content items 110 that are included on aggregated content list 108.

In some embodiments, aggregator service 104 may determine, using the information received in device state 106, that at least a portion of the unsolicited electronic content stored on device 102-A has been accessed or deleted by profile 101 associated with device 102-A. Aggregator service 104 may then determine that a copy of the unsolicited electronic content is also stored on a second device 102-B associated with the same profile 101. Aggregator service 104 may make this determination using information received in device state 106, information stored locally to aggregator service 104 (e.g., a configuration file maintaining a mapping of profiles to associated devices 102, etc.), or in any similar manner. Aggregator service 104 may then send a notification via network 112 to device 102-B instructing the device 102-B to delete the unsolicited electronic content (e.g., deletion notice 180). Deletion notice 180 may be a modified list of electronic content for the profile that has removed any reference to the unsolicited electronic content item that is to be deleted.

In some embodiments, different aggregated content lists are generated for different devices. For example, a first aggregated content list may be generated for device 102-A and a different, second aggregated content list is generated for device 102-B. The different aggregated content lists may be generated to reflect different capabilities of the devices (e.g., an ebook reader may be unable to display videos and so would not benefit from an aggregated content list that lists videos) and/or consumption patterns associated with the different devices. For example, device 102-A may be a television set top box and may be used exclusively for watching videos (e.g., television shows and movies). Accordingly, even though device 102-A may also be capable of playing music, no music may be included in an aggregated content list for device 102-A since the profile 101 has never accessed music on device 102-A.

In one embodiment, aggregator service 104 determines content preferences for user profile 101 based on activity included in device state 106. For example, a user may watch a large number of science fiction videos on device 102-A. Aggregator service 104 may determine an update for an aggregated content list for device 102-B based on the device state 106. For example, aggregator service 104 may increase a rank of science fiction titles in the aggregated content list for device 102-B. The science fiction titles may or may not be videos. For example, ranks of science fiction novels may be increased in the aggregated content list for device 102-B based on the device state 106 of device 102-A even though no novels may have been consumed on device 102-A. The updated aggregated content list may then be sent to the second device 102-B.

Figure 2:
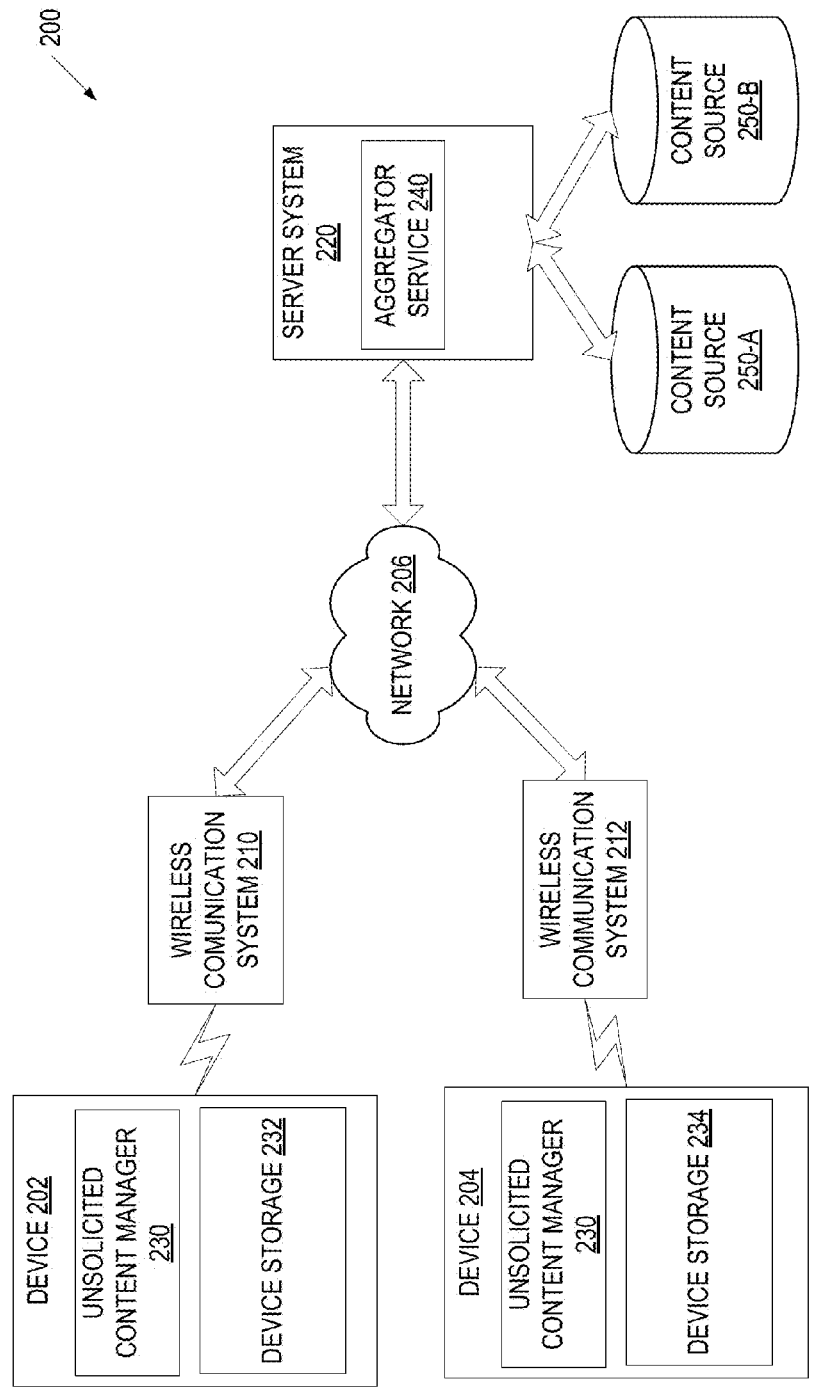
FIG. 2 is a block diagram of an example network architecture including a device with an unsolicited content manager connected to a server system with an aggregator service, in accordance with one embodiment.

FIG. 2 is a block diagram of an example network architecture 200 in which embodiments described herein may operate. The network architecture 200 may include server system 220 and multiple devices 202, 204 capable of communicating with server systems 220 via a network 206. Network 206 may include, but is not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network 206 may have any suitable communication range associated therewith and may include, for example, public networks (e.g., the Internet), metropolitan area networks (MANs), wide area networks (WANs), local area networks (LANs), or personal area networks (PANs). In addition, the network 206 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The devices 202, 204 may include any type of mobile computing device (e.g., that has a finite power source) or traditionally non-portable computing device. The devices 202, 204 may be configured with functionality to enable consumption of one or more types of electronic content. The electronic content may be any type of format of electronic content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content.

Devices 202, 204 and server system 220 deliver and/or receive media items, applications, content requests, content lists, upgrades, device state information, and/or other information via the network 206. For example, device 204 may download or receive data from the server system 220. The server system 220 also receives various requests, instructions and other data from the device 204 via the network 206. The server system 220 may include one or more machines (e.g., one or more server computer systems, routers, gateways, etc.) that have processing and storage capabilities to provide the above functionality.

Communication between the server system 220 and the devices 202, 204 may be enabled via any communication infrastructure. One example of such an infrastructure includes a combination of a wide area network (WAN) and wireless infrastructure, which allows a user to use the devices 202, 204 to purchase items and consume items without being tethered to the server system 220 via hardwired links. The wireless infrastructure may be provided by one or multiple wireless communications systems, such as wireless communications system 210 and wireless communication system 212. One of the wireless communication systems 210, 212 may be a Wi-Fi access point connected with the network 206. Another of the wireless communication systems 210, 212 may be a wireless carrier system that can be implemented using various data processing equipment, communication towers, etc. Alternatively, or in addition, the wireless carrier system may rely on satellite technology to exchange information with the device 204.

The devices 202, 204 may be capable of receiving and executing applications that may perform various functions. Applications may be developed by an entity affiliated with the device (e.g., a manufacturer of the devices 202, 204) and/or by third parties. For example, applications provided by social network services, game developers, news providers, and so forth may be installed on the device. Each of the applications that are installed on the device 104 may use application programming interfaces (APIs) provided by the device for waking up the device, communicating with remote computing devices (e.g., server systems), and/or performing other operations.

Devices 202, 204 may include, among other physical and logical modules, unsolicited content manager 230 and device storage 232, 234. Unsolicited content manager 230 can manage electronic content stored in device storage 232, 234 as well as optimize the functionality of devices 202, 204 by dynamically managing the amount of free space within device storage 232, 234. Unsolicited content manager 230 may download unsolicited electronic content for a user profile based on preferences associated with the profile, device characteristics, the amount of available free space in device storage 232, 234, the state of electronic content already stored in device storage 232, 234, or other similar information. An electronic content item may be downloaded based on a list from an aggregator service 240 and without receiving a download request from a user or application. Unsolicited content manager 230 may download unsolicited electronic content into an unsolicited content storage area on device storage 232, 234 so that content relevant to the preferences of the user profile may be made available on devices 232, 234 without regard to a specific user request or application request.

Unsolicited content manager 230 may send information to aggregator service 240 in order to obtain a list of electronic content items that may be relevant to the user profile associated with devices 202, 204. Unsolicited content manager 230 may then send a request to a download manager 345 to download the electronic content items from the list provided by aggregator service 240 into device storage 232, 234. In some embodiments, unsolicited content manager 230 may initiate download of multiple electronic content items from the list to use as much of the available device storage 232, 234 as possible without impacting the performance of devices 202, 204. Unsolicited content manager 230 may monitor the state of free space in device storage 232, 234 and compare it against a free space buffer threshold value to ensure that a sufficient amount of free space (referred to as a free space buffer) is present on the device. The amount of free space may be a total amount of space available in a single storage component or across multiple storage components of device storage 232, 234. In one embodiment, the amount of free space represents a total amount of storage that is unused (e.g., not occupied by either standard content or unsolicited content). Unsolicited content manager 230 may increase or decrease the free space buffer threshold value based on the observed activity of devices 202, 204 to maintain the appropriate level of free space in device storage 232, 234.

In one embodiment, unsolicited content manager 230 may first identify configuration data associated with devices 202, 204. Configuration may include preloaded settings of the devices 202, 204, of operating system of the devices, and/or of unsolicited content managers installed on the devices 202, 204. Configuration data may include a minimum write speed associated with devices 202, 204 (e.g., the rate at which the device may write data into storage based on the processor capabilities of the device and the type of storage available in the device), a minimum free space buffer threshold associated with the device (e.g., a seed threshold that can be received by the content delivery system as a default setting), a low storage threshold of the device (e.g., a minimum amount of free space required by the operating system of the device), or other similar information. In some implementations, the low storage threshold can indicate an amount of free storage space at which the operating system of devices 202, 204 may prompt a user to delete content items from the storage component of the device (e.g., by presenting a notification to the user via a user interface). In some implementations, unsolicited content manager 230 may identify the configuration data by executing a data lookup instruction to access the configuration data stored in a data structure on devices 202, 204. Unsolicited content manager 230 may then analyze the configuration data with respect to storage usage data collected over a previous time period of activity to determine if the default configuration values should be modified based on observed activity. This may include comparing a portion of the configuration data (e.g., a default or minimum write speed) to a portion of the storage usage data (e.g., an observed write speed). For example, unsolicited content manager 230 may monitor device storage 232, 234 over a particular period of time (e.g., every 60 seconds, every 120 seconds, every 30 seconds, and so on) to determine statistics related to write speed, total device storage used, total free space available, etc. for use in the comparison. The previous time period may encompass a single monitoring cycle (e.g., the last 60 seconds) or multiple monitoring cycles (e.g., the last 360 seconds or the last 6 monitoring cycles).

Unsolicited content manager 230 may subsequently determine the maximum amount of storage space in device storage 232, 234 that may be consumed in a future time period based on the previously observed activity. The future time period may correspond to a next monitoring cycle (e.g., the next 60 seconds). In one embodiment, unsolicited content manager 230 may determine an observed write speed associated with device storage 232, 234 by calculating a weighted observed write speed over the previously measured time period and comparing to a recent observed write speed. The weighted observed write speed may be computed by incrementally decreasing a previously recorded maximum write speed over successive monitoring time periods. For example, a weight of less than 1 (e.g., 0.9) may be applied to the previous maximum observed write speed. At each monitoring cycle, unsolicited content manager 230 may determine a recent observed write speed, and additionally compare the recent observed write speed to a weighted previous maximum write speed. The weight that is applied to the previous maximum write speed may be decreased over time based on how long it has been since the previous maximum write speed was recorded. The new observed write speed may be the larger of the recent observed write speed and the weighted previous maximum write speed. Thus, an observed write speed that is calculated during a monitoring period where a greater amount of data has been written to storage will not cause the determined buffer threshold to remain inappropriately large for successive monitoring periods where the actual storage space usage decreases. Unsolicited content manager 230 may then compare the observed write speed (e.g., the new observed write speed) to the minimum write speed to determine a maximum expected write speed for a time period in the future (e.g., a write speed expected over the next 60 seconds).

In an illustrative example, an initial write speed may be set to 4 MB per minute (e.g., given that observed write speeds are measured over a 60 second monitoring frequency cycle). The write speed may be set using MB (megabytes), GB (gigabytes) or in any other storage size value. The write speed rate may be measured using the period of time for a selected monitoring frequency cycled (e.g., per minute given a 60 second monitoring frequency). During a first monitoring period, unsolicited content manager 230 may determine that the observed write speed increased to 8 MB per minute due to an application writing to device storage. During a second monitoring period, unsolicited content manager 230 may determine that the observed write speed had decreased to 6 MB per minute due to a decrease in application activity. Unsolicited content manager 230 may calculate the weighted observed write speed for the second monitoring period by decreasing the previously determined maximum (8 MB per minute) by a decay factor (e.g., decreasing by 10 percent). The resulting weighted observed write speed (e.g., 7.2 MB per minute) may then be compared to the observed write speed for the second monitoring period (6 MB per minute) to determine the new maximum expected write speed (e.g., since 7.2 MB per minute is the larger value, 7.2 MB per minute will be selected as the new maximum expected write speed.

If, during subsequent monitoring periods, the observed write speed continues to remain below the previously calculated maximum, unsolicited content manager 230 can continue to reduce the weighted observed write speed until it reaches the initial write speed of 4 MB per minute. In some implementations, unsolicited content manager 230 may calculate the weighted observed write speed by decreasing the previous maximum by incrementally larger amounts. For example, the 8 MB per minute maximum can be decreased by 10 percent during the first subsequent monitoring period, by 20 percent during the second subsequent period, and so on. Alternatively, unsolicited content manager 230 may calculate the weighted observed write speed by decreasing the previously determined weighted observed write speed by the same amount. For example, the 8 MB per minute maximum can be decreased by 10 percent during the first subsequent monitoring period, resulting in a new maximum of 7.2 MB per minute. During a second subsequent monitoring period, the new maximum of 7.2 MB per minute can be decremented again by 10 percent to yield a new value of 6.48 MB per minute, and so on.

Unsolicited content manager 230 may then determine a time interval at which the total amount of free storage space and/or available amount of free storage space may be checked (e.g., the 60 second interval) and multiply the maximum write speed by the time interval to determine the maximum amount of storage that is predicted to be written to over the future time period. Unsolicited content manager 230 may then set the free space buffer threshold for the free space buffer in device storage 232, 234 to be greater than the maximum amount of storage space that is predicted to be consumed in the future time period.

Unsolicited content manager 230 may then determine the total amount of free storage space in device storage 232, 234 and set a size for an unsolicited content storage area of a storage component on device 202, 204 to be at least the total amount of free storage space minus the free space buffer threshold. Total free space represents the total size of a storage component (or group of storage components) minus an amount of space occupied by standard content). The unsolicited content storage area of device 202, 204 may be the total amount of storage that may be dedicated to loading electronic content for the user profile associated with device 202, 204.

Unsolicited content manager 230 may monitor the storage space usage of device storage 232, 234 at periodic intervals (e.g., every 60 seconds). Monitoring the storage space usage may include determining a total free storage space for a storage component (space that remains after subtracting size of standard content from size of storage component) as well as determining an available free storage space for the storage component (space that remains after subtracting size of the unsolicited content storage area from the total free space). A size of the unsolicited content storage area may be dynamic. As additional standard content is added to the storage component the total free storage space will shrink and the size of the unsolicited content storage area will be reduced accordingly. As standard content is deleted from the storage component, the total free storage space will grow, and the size of the unsolicited content storage area will be increased accordingly.

If unsolicited content manager 230 determines that the storage space usage of device storage 232, 234 causes the amount of available free space to fall below the free space buffer threshold, unsolicited content manager 230 may increase the free space buffer threshold by a predetermined incremental amount of space. This may cause a size of the unsolicited content storage area to be reduced. If unsolicited content manager 230 determines that the storage space usage of device storage 232, 234 causes the amount of free space available to exceed the free space buffer threshold, unsolicited content manager 230 may decrease the free space buffer threshold by a predetermined incremental amount of space. This may cause a size of the unsolicited content storage area to be increased. In some embodiments, unsolicited content manager 230 may use a larger amount of space to increase the threshold than to decrease the threshold. Alternatively, the increase and decrease amounts may be the same.

In some embodiments, unsolicited content manager 230 may also consider whether data can be deleted faster than the free space buffer can be filled when determining the threshold size. For example, unsolicited content manager 230 may compare the observed write speed over a period of time to the delete speed associated with device storage 232, 234. If the observed write speed is faster than the delete speed of device storage 232, 234, it may indicate that the free space buffer can be filled faster than data may be deleted, and thereby requiring an increase of the free space buffer threshold.

Similarly, unsolicited content manager 230 may consider upload and download speeds associated with the network connections of devices 202, 204 (e.g., wireless communication systems 210, 212). If unsolicited content manager 230 determines that the delete speed associated with device storage 232, 234 is faster than the download speed associated with the network connection of devices 202, 204, this can indicate that electronic content may be deleted from the device faster than it can be added. In this instance, unsolicited content manager 230 may confirm the size of the free space buffer threshold and leave it unchanged. Conversely, if devices 202, 204 are connected to a high speed network connection (e.g., via USB cable, or high speed internet), the download speed could be faster than the delete speed associated with device storage 232, 234, which can indicate that electronic content may be downloaded faster than it may be deleted. In this instance, unsolicited content manager 230 may increase the size of the free space buffer threshold.

In some embodiments, a size of the available free space is used to determine when to download new unsolicited content items. The unsolicited content manager 230 may subtract the size of the free space buffer threshold from the available free storage space. If a remainder is larger than a threshold amount and/or larger than a size of an item on an aggregated list of unsolicited content items, then the unsolicited content manager 230 may request that a download manager download the item on the aggregated list. The threshold amount may be 1 MB, 10 MB, 1 GB, or some other threshold value. The threshold amount may depend on types of content that may be consumed on the device. For example, if the device only consumes videos, than the threshold amount may be larger than if the device consumes ebooks.

Server system 220 may include an aggregator service 240 which can receive information from devices 202, 204, and provide lists of electronic content items to be downloaded by devices 202, 204. Server system 220 may provide aggregator service 240 with access to one or more content sources 250-A, 250-B that may correspond to any source of electronic content (e.g., video, audio, e-books, periodicals, etc.). In one embodiment, aggregator service 240 may obtain ranked lists of content for a user profile based on the type of content stored in content source 250-A, 250-B. Aggregator service 240 may then compile an aggregated list of content items using the lists from content sources 250-A, 250-B to send to the requesting device 202, 204. The aggregated list may be constructed using known preferences associated with the user profile, based on available free space on the requesting device, based on sizes of electronic content items, or any similar selection criteria. Additionally, aggregator service 240 may manage the electronic content for a single profile associated with multiple devices, multiple profiles associated with a single device, and/or multiple profiles associated with multiple devices.

In one embodiment, aggregator service 240 may determine that a user profile is associated with both device 202 and device 204 (e.g., a single user profile maintains electronic content on a mobile phone and a tablet computer). Aggregator service 240 may cause unsolicited electronic content items to be stored in device storage 232 of device 202, and/or device storage 234 of device 204. Aggregator service 240 may subsequently determine, based on information received from device 202, that unsolicited electronic content may be deleted from device 204. For example, aggregator service 240 may receive information describing the state of electronic content associated with a user profile that is stored in device storage 232 of device 202. The state of the electronic content may include information identifying the unsolicited electronic content items downloaded into device storage 232, the size of each unsolicited electronic content item, whether the unsolicited electronic content items have been accessed or deleted by the user, the amount of total free space and/or available free space remaining on a storage component of the device, etc.

Aggregator service 240 may determine, using information stored by aggregator service 240, that the user profile is also associated with content stored in device storage 234 of device 204. Aggregator service 240 may then determine the state of unsolicited electronic content stored for the profile in device storage 234 of device 204. Aggregator service 240 may then determine a combined state of the electronic content for the user profile using the state of device storage 232 and the state of device storage 234. For example, aggregator service 240 may determine that the same unsolicited movie has been downloaded on both devices. If the aggregator service 240 determines that the combined state of the electronic content associated with a profile across both device 202 and 204 satisfies an electronic content deletion rule, aggregator service 240 may send a notification to one or both of the devices 202, 204 to delete an unsolicited electronic content item stored in device storage 232, 234 (e.g., one of the electronic content items in device storage that was downloaded by the unsolicited content manager 230 of the device without first receiving a download request from a user associated with the profile).

For example, aggregator service 240 may determine, using information describing the state of device storage 232, that an unsolicited electronic content item stored on device 202 has been accessed (e.g., the user has viewed a video on the device) or deleted by the user profile on device 202. Aggregator service 240 may then determine, using the information describing the state of device storage 234, that the same unsolicited electronic content item is also stored on device 204. Aggregator service 240 may subsequently send a notification to device 204 to delete the unsolicited electronic content item from device storage 234.

In an alternative embodiment, aggregator service 240 may determine, from the combined state of the electronic content, that a total number of electronic content items having a particular property are distributed across both devices 202 and 204 associated with the user profile (e.g., the user profile has 20 videos downloaded across both devices). Aggregator service 240 may then determine that the total number of electronic content items with the particular property that are distributed across the two devices 202 and 204 exceeds a predetermined electronic content threshold (e.g., the number of videos downloaded exceeds a threshold of 10). Upon determining that the threshold number has been exceeded, aggregator service 240 may send a notification to device 204 to delete an unsolicited electronic content item from device storage 234. In some embodiments, aggregator service 240 may additionally send a notification to device 202 to delete an unsolicited electronic content item from device storage 232.

Figure 3:
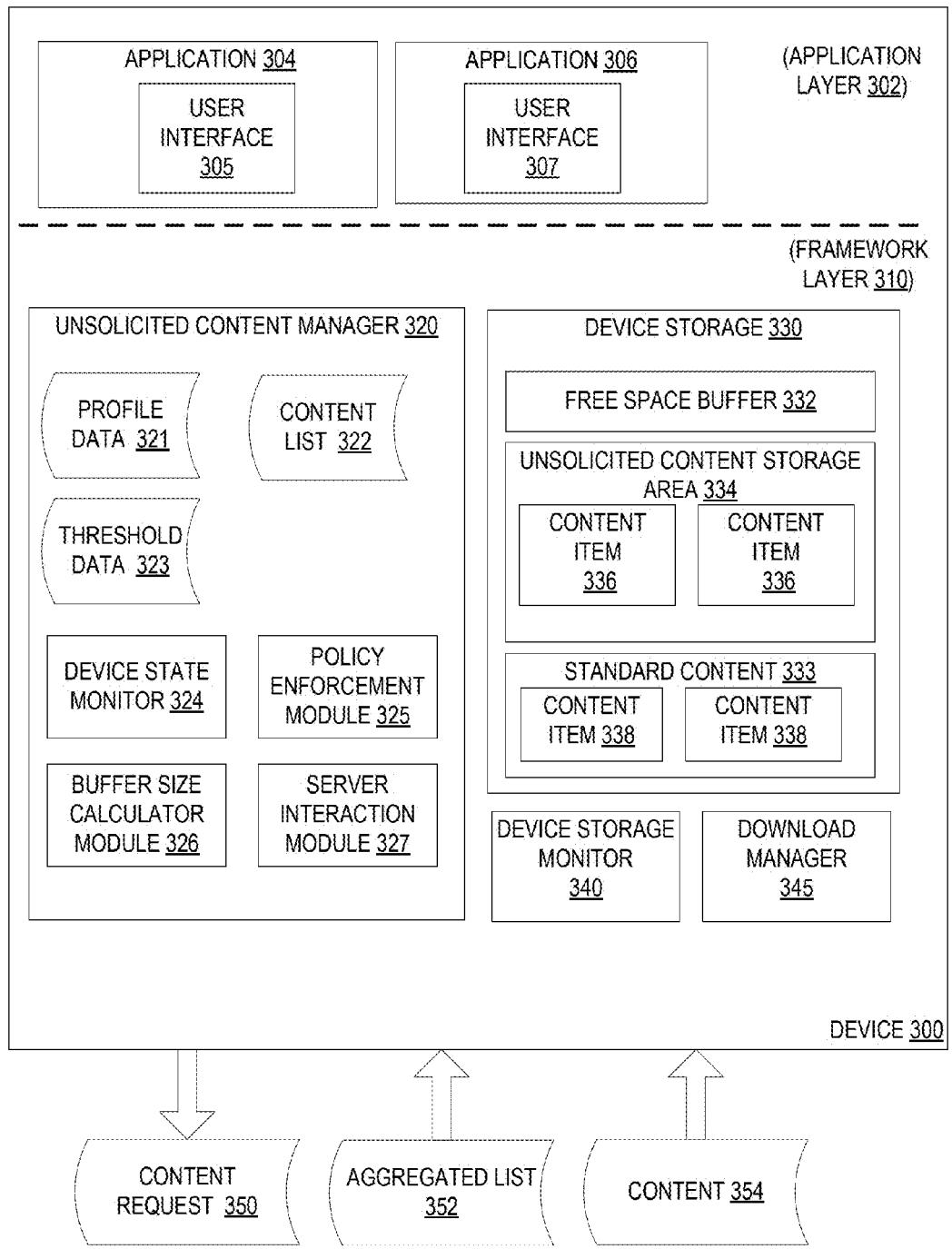
FIG. 3 is a block diagram of a logical view of a device, in accordance with one embodiment.

FIG. 3 is a block diagram of a logical view of a device 300, in accordance with one embodiment. The device 300 is logically divided into a kernel layer (not shown), a framework layer 310 and an application layer 302. The kernel layer is reserved for privileged processes, and provides access to operations that are not available at the framework layer 310 or application layer 302. The kernel layer also acts as an abstraction layer between hardware and the higher layers (e.g., the framework layer 310 and application layer 302). The framework layer 310 provides higher-level services to applications. The framework layer 310 may include an unsolicited content manager 320 that manages the content and free space of device storage 330, and a device storage monitor that monitors the activity of device storage 330.

Applications 304, 306 that run at the application layer 302 may include standard applications that are automatically included in the device and additional applications, which may be third party applications and/or other applications that are not pre-installed on the device 300. Examples of applications (or apps) 304, 306 may include a social network application (e.g., a Goodreads® app, a Facebook® app, a Google+® app, a LinkedIn® app, etc.), an electronic mail (email) application (e.g., a FireOS® mail app, a Yahoo® Mail! app, a Gmail® app, an OS X® mail app, etc.), a calendar application, games, a newsreader application, a video viewing application, or any similar type of application to permit user to access downloaded electronic content. Applications 304, 306 may include user interfaces 305, 307. The user interfaces 305, 307 may be graphical user interfaces (GUIs) or command line user interfaces. User interfaces 305, 307 may enable a user to easily access or delete downloaded electronic content. For example, application 304 may be a video viewing application with a user interface 305 that may list the videos available in the device storage 330 of device 300.

The device 300 may include an unsolicited content manager 320, device storage 330, device storage monitor 340, and download manager 345 in framework layer 310. Unsolicited content manager 320 may be responsible for managing a free space buffer 332 as well as unsolicited electronic content items 336 that are downloaded into unsolicited content storage area 334 of device storage 330. Unsolicited content manager 320 may include configuration information stored locally on the device such as profile data 321, content list 322, and threshold data 323 to assist with device management activities.

Profile data 321 may include information to identify one or more user profiles associated with the device. Profile data 321 may include user identification information (e.g., name, address, billing information, email address) as well as information to connect the user profile to a content delivery service or online marketplace. Content list 322 may be a list of content items 336 that are stored in unsolicited content storage area 334 under the management of unsolicited content manager 320. Content list 322 may be indexed by profile so that device manger 320 may determine which content items have been downloaded by a particular profile. Content list 322 may additionally maintain the state of any content item 336 in unsolicited content storage area 334. For example, whether a content item has been accessed, and if so, how much of the content item has been consumed by the user (e.g., for a video, content list 322 may retain the timestamp of where the user left off during the last viewing).

Threshold data 323 may include threshold settings calculated by unsolicited content manager 320 during its management of unsolicited content storage area 334 and free space buffer 332. For example, threshold data 323 may store a free space buffer threshold that may be used to determine whether the size of free space buffer 332 should be increased or decreased based on usage of device storage 330. Additionally, threshold data 323 may include a size setting for unsolicited content storage area 334 that may be calculated by unsolicited content manager 320. Threshold data 323 may also be used to store various default settings based the capabilities of device 300. For example, threshold data 323 may store a minimum write speed associated with device storage 330, a minimum free space buffer threshold of the operating system, or a low storage threshold of the operating system. The low storage threshold may represent a threshold amount of total free storage that, when met, causes the operating system to generate a notification or prompt that data should be deleted from the device to free up storage space. For example, if the amount of total free storage drops below 10% of a size of a storage component in an embodiment, then the low storage threshold may be reached and the operating system may generate a low storage notification.

Unsolicited content manager 320 may also include device state monitor 324, policy enforcement module 325, buffer size calculator module 326, and server interaction module 327. Device state monitor 324 can update profile data 321 when new user profiles are added to the device, and similarly, removed from the device. Device state monitor 324 may additionally update the content list 322 while managing the content items 336 that are downloaded into unsolicited content storage area 334, determine the capabilities of device 300 to store default settings in threshold data 323, and determine whether data is being added to free space buffer 332 faster than it can be deleted from unsolicited content storage area 334. Device state monitor 324 may continuously tune the size of the unsolicited content storage area 334 and free space buffer threshold based on observed device activity as monitored by device storage monitor 340.

Policy enforcement module 325 may be responsible for completing one or more actions upon determining that a threshold has been reached. For example, device storage monitor 340 may determine that the free space buffer 332 has fallen below the free space buffer threshold stored in threshold data 323. Device storage monitor 340 may then alert policy enforcement module 325 to take a predefined action (e.g., increasing the size of the free space buffer threshold, deleting one or more content items 336 from unsolicited content storage area 334, or other similar action). Policy enforcement module 325 may then either complete the action or invoke another component of unsolicited content manager 320 to complete the action. For example, policy enforcement module 325 may invoke buffer size calculator module 326 to recalculate the size of the free space buffer threshold to maintain a larger free space buffer 332. Policy enforcement module 325 may then invoke device state monitor 324 to generate an instruction for the storage component to delete one or more content items 336 from unsolicited content storage area 334 to add free space to free space buffer 332. Similarly, upon receiving a notification from device storage monitor 340 that the amount of free space in free space buffer 332 has exceeded the free space buffer threshold, policy enforcement module 325 may invoke server interaction module 327 to request additional electronic content from a content delivery service (e.g., aggregator service 240 of server system 220 in FIG. 2).

As noted above, buffer size calculator module 326 may use information collected by other components of device 300 to recalculate the free space buffer threshold size to adjust the size of unsolicited content storage area 334 as well as the size of the free space buffer 332. Buffer size calculator module 326 may complete the recalculation either upon a breach of the free space buffer threshold (e.g., as indicated by policy enforcement module 325) or continuously based on observed activity (e.g., as indicated by device state monitor 324). Buffer size calculator module 326 may utilize device default characteristics as well as observed processing characteristics to adjust the free space buffer size.

Server interaction module 327 may conduct all communication activity between device 300 and an electronic content delivery service. Upon determining that the free space buffer 332 has exceeded the free space buffer threshold, device storage monitor 340 may invoke policy enforcement module 325 to take some action. Policy enforcement module 325 may determine that additional content items 336 should be downloaded to unsolicited content storage area 334 and invoke server interaction module 327 to retrieve content items 336 that are relevant to the active user profile. Server interaction module 327 may send content request 350 to the content delivery service (e.g., aggregator service 240 of server system 220 in FIG. 2), receive aggregated list 352 from the content delivery service containing a list of content items for the profile, and subsequently invoke download manager 345 to download unsolicited content 354 into unsolicited content storage area 334.

Aggregated list 352 may be or include an aggregated list of content items for the active user profile from an aggregator service. Aggregated list 352 may also include content items for other user profiles associated with device 300. In some embodiments, aggregated list 352 may include content items from a single content source, or from multiple content sources, based on content preferences associated with the user profiles (e.g., whether the user prefers videos over electronic books, etc.) as well as attributes of device 300 (e.g., available free storage, ability of the device to display specific types of content, etc.). Aggregated list 352 may be received by device 300 as a file that includes the electronic content itself. Alternatively, aggregated list 352 may be received as a data structure with information describing each item on the list, which may enable the device 300 to download each item. For example, aggregated list 352 may be a list of video content items, electronic publication content items, music albums, etc. ranked in a stacked order based on preferences associated with the user profile (e.g., if the user prefers television shows to movies, and books to either television shows or movies, content items of electronic books may be presented highest on the list, followed by television shows and movies).

Aggregated list 352 may additionally include other information to identify electronic content items for the user profile. In some implementations, the content list may include a unique identifier for each electronic content item that identifies a specific electronic content item provided by an associated content delivery service (e.g., a title of the content item, a serial number such as an International Standard Book Number (ISBN) or Amazon Standard Identification Number (ASIN), an inventory number, a Uniform Resource Locator (URL) for the location of the content item, etc.). Aggregated list 352 may also include information describing the content such as content type (e.g., audio, video, electronic book, etc.), content genre (e.g., thriller, mystery, action, etc.), whether the content is intended for adults only, or any similar information. Aggregated list 352 may also include profile information such as a unique identifier associated with the user profile, as well as ranking information for each content item based on how the content item aligns with the preferences associated with the user profile (e.g., if the user prefers movies to electronic books, any items in the list that are movies can have a higher rank on the list than electronic books).

As noted above, server interaction module 327 may receive aggregated list 352 and subsequently invoke download manager 345 to download one or more of the electronic content items from aggregated list 352 into unsolicited content storage area 334. In some implementations, aggregated list 352 may be used by aggregator service to send instructions to device 300 to delete content from unsolicited content storage area 334. For example, upon receipt of aggregated list 352, server interaction module 357 may compare the content items in aggregated list 352 to the content items 336 that are already in unsolicited content storage area 334. If there are content items 336 already in unsolicited content storage area 334 that are not present in aggregated list 352, server interaction module may interpret this as an instruction to remove the applicable content items 336 from unsolicited content storage area 334. Server interaction module 327 may then issue an instruction to notify the operating system of device 330 to delete the applicable content items 336 from unsolicited content storage area 334. Server interaction module 327 may additionally determine that there is space in the unsolicited content storage area 334 for additional unsolicited content after deleting the content items that are no longer in the aggregated list 352. Accordingly, server interactions module 327 may send instructions to download manager 345 to download one or more top ranked unsolicited content items in aggregated list 352 until the unsolicited content storage area is filled.

In some embodiments, aggregated list 352 may contain instructions for each electronic content item in the list to direct device 330 to either download the item or delete the item from unsolicited content storage area 334. Server interaction module 327 may then invoke download manager to initiate download of the items on the list to download, and issue an instruction to notify the operating system to delete the applicable content items 336 from unsolicited content storage area 334 where applicable.

In some embodiments aggregated list 352 may include content licensing or authorization information associated with the user profile that can indicate whether the user profile no longer has authorization to access particular electronic content items (e.g., if content item is protected with digital rights management (DRM) to which the user profile does not have access, if the content delivery service has revoked the license of the user profile to access the content item, if the user profile no longer subscribes to the content delivery service, if the content delivery service no longer provides the content item, etc.). For example, device state monitor 324 may periodically invoke server interaction module 327 to synch with the content delivery service to check the authority of the user profile to continue to access content items 336 currently stored in unsolicited content storage area 334. If aggregated list 352 indicates that the user profile no longer has authority to access a content item on the list, server interaction module 327 may interpret this as an instruction to delete the content item 336 from unsolicited content storage area 334 and issue an instruction to notify the operating system to delete the applicable content item 336 from unsolicited content storage area 334.

In some embodiments, aggregated list 352 may be used to maintain the inventory of content items 336 on device 300. Server interaction module 327 may update content list 322 with content items from aggregated list 352 that may be later used to present to a user in one of applications 304, 306 via user interfaces 305, 307. Applications 304, 306 may render and present user interfaces 305, 307 to indicate that content items 336 have been downloaded on the device 300 when a user is browsing through available content to consume, both cloud-based content and content that was stored as unsolicited content items 336.

Device storage 330 may represent the one or more storage component on device 300. Device storage 330 may include one or more of an embedded storage component (e.g., Embedded Multi Media Card (EMMC) storage), removable storage (e.g., secure digital (SD) card storage), flash memory, disk storage, or any similar storage method. Device storage 330 may be managed by device 300 as a single storage space across multiple storage components, or separately by individual storage component. Device storage 330 may include free space buffer 332 that represents an amount of free space in device storage 330 that unsolicited content manager 320 has determined to be an optimal level of free space to ensure that device 300 will operate efficiently. Unsolicited content storage area 334 represents the portion of device storage 330 to be used for unsolicited electronic content items 336 that are downloaded for the user profile (e.g., unsolicited electronic content for the user profile from the content delivery service and downloaded).

In some implementations, device storage 330 may include additional unsolicited content storage areas 334 for additional profiles associated with the device. Each unsolicited content storage area 334 may be managed separately by unsolicited content manager 320 according to the associated profile. Unsolicited content manager 320 may primarily manage the unsolicited content storage area 334 associated with the active profile (e.g., the user profile that is actively being used on the device 300), modifying unsolicited content storage area 334 for other profiles only when appropriate due to storage constraints. Standard content 333 represents all consumed storage other than the unsolicited content storage area, which may include content items 338, operating system files, used generated content, and so on. Content items 338 represent electronic content items that may be downloaded without the involvement of unsolicited content manager 320 (e.g., if one of applications 306 requests a download of content).

As noted above, device storage monitor 340 may represent a component that periodically monitors the activity of device storage 330. Device storage monitor 340 may be a component of the device 300 operating system or may be a component that is separate from the operating system. Device storage monitor 340 can collect statistical information at periodic intervals (e.g., a 60 second monitoring frequency), save the statistics, pass the statistics to device state monitor 324 for further processing, or use the statistics to determine if any set thresholds have been breached and subsequently invoke policy enforcement module 325 to implement a preset policy.

As noted above, download manager 345 may represent a component of device 300 that manages downloading electronic content into device storage 330. Download manager 345 may be invoked by a sub component of unsolicited content manager 320 (e.g., server interaction module 327) to download content items 336 into unsolicited content storage area 334. Alternatively, download manager 345 may be invoked by applications 304, 306 to download content items 338 into standard content 333. In some embodiments, download manager 345 may communicate with unsolicited content manager 320 to initiate cache cleanup operations on unsolicited content storage area 334 in order to provide additional storage space for standard content 333. For example, application 304 may invoke download manager 345 to download a content item 338 to store in standard content 333. Upon determining that there is not enough free storage space to complete the download, download manager 345 may send a notification to unsolicited content manager 320 to remove one or more content items 336 from unsolicited content storage area 334 in order to provide additional storage space in standard content 333 for the requested download.

In an illustrative example, device state monitor 324 may identify device data that can include a minimum write speed associated with device 300 (e.g., the rate at which device 300 may write data to device storage 330), a minimum free space buffer threshold associated with device 300 (e.g., a seed threshold that can be received by the content delivery system as a default setting), and a low storage threshold of device 300 (e.g., the minimum amount of free space for the operating system to function). Device state monitor 324 may then determine a write speed associated with device storage 330 by comparing the minimum write speed to an observed write speed observed over a period of time (e.g., calculated from information received from device storage monitor 340 based on observed storage write operations to device storage 330). As noted above, the observed write speed may be computed by incrementally decreasing a previously recorded maximum write speed over successive monitoring time periods. At each monitoring cycle, device state monitor 324 may determine a new observed write speed, and additionally compare the new observed write speed to a weighted previous maximum write speed. The weight that is applied to the previous maximum write speed may be decreased over time based on how long it has been since the previous maximum write speed was recorded. The weighted observed write speed may be the larger of the new observed write speed and the weighted previous maximum write speed. Thus, an observed write speed that is calculated during a monitoring period where a greater amount of data has been written to storage will not cause the determined buffer threshold to remain inappropriately large for successive monitoring periods where the actual storage space usage decreases. The larger of the minimum write speed and the weighted observed write speed may be selected as the write speed. Device state monitor 324 can then determine a monitoring frequency at which device storage monitor 340 may be initiated (e.g., every 60 seconds) to check the total amount of free storage space available in device storage 330.

Device state monitor 324 may then invoke buffer size calculator 326 to calculate the free space buffer threshold. Buffer size calculator 326 may first multiply the write speed by a time interval associated with the monitoring frequency to determine a predicted storage space usage of device storage 330 for a future time period (e.g., for a future instance of the time interval). The resulting value can approximate the maximum predicted amount of data that can be written to device storage 330 during the time interval during which the device storage monitor remains idle before making the next status check of the state of storage component 330. If the predicted storage space usage is greater than the minimum free space buffer threshold determined by the device state monitor 324, this can indicate that the default buffer size threshold may not be large enough to accommodate the expected write activity to the storage space. Buffer size calculator 326 may then adjust the buffer size threshold to the larger value to account for the expected activity. Additionally, to account for operating system requirements, buffer size calculator may add the low storage threshold value to the larger of the minimum free space buffer threshold and the predicted storage space usage to determine the updated free space buffer threshold. Buffer size calculator may then set the size of unsolicited content storage area 334 to be equal to the total amount of free storage space available in device storage 330 minus the free space buffer threshold.

In some embodiments, device storage monitor 340 may continue to monitor device storage 330 and notify policy enforcement module 325 if the amount of free space in free space buffer 332 meet, exceed, or fall below the free space buffer threshold in effect. If the free space in free space buffer 332 falls below the free space buffer threshold (e.g., current measured device activity indicates that storage is being filled at a higher rate), policy enforcement module 325 may be invoked to increase the size of the free space buffer threshold. Conversely, if the free space in free space buffer 332 exceeds the free space buffer threshold (e.g., indicating that more free space is available on the device that may be used for unsolicited electronic content), policy enforcement module 325 may be invoked to decrease the size of the free space buffer threshold.

In some embodiments, device state monitor 324 may make adjustments to the free space buffer threshold using download speeds associated with a network connection of the device. If content may be downloaded faster than it can be deleted from storage component 330, device state monitor may invoke buffer size calculator module to increase the size of the free space buffer threshold. Conversely, if the delete speed is faster than the download speed, device state monitor 324 may confirm the free space buffer threshold. Delete speed represents a rate at which the unsolicited content can be deleted from the unsolicited content storage area. Delete speed may be based on a setting of the device that represents an amount of data that is deleted per delete request from the unsolicited content manager. In one embodiment, only a single delete request is issued per instance of the time interval. Alternatively, delete speed may be based on an amount of time that it takes to perform a deletion. Delete speed may be based on a storage type of the storage component. Device state monitor 325 may determine download speed by collecting statistical information when electronic content is downloaded to the device 300 and maintaining an average download speed in a local storage space (e.g., threshold data 323). Alternatively, processing logic may determine the download speed dynamically by sending and receiving packets to a network location periodically while the device is active.

In some embodiments, device state monitor 324 may make adjustments to the free space buffer threshold if the free space buffer 332 is filled faster than data can be deleted from unsolicited content storage area 334. Device state monitor 324 may determine an observed write speed associated with device storage 330 that is the larger of the minimum write speed and the weighted observed write speed over a previously monitored time period. If the delete speed is faster than the observed write speed, this may indicate that data can be deleted from the unsolicited content storage area 334 faster than the free space buffer 332 may be filled, thus requiring no modification to the free space buffer threshold. Conversely, if the free space buffer was filled faster than it could be deleted from the cache, prompting a notification from device storage monitor 340, the free space buffer threshold may be increased.

In some embodiments, after an additional time period, device storage monitor 340 may determine a new observed write speed associated with device storage 330. The new observed write speed may be the weighted observed write speed measured by device state monitor 324 over the additional time period. Buffer size calculator may then multiply the new observed write speed by the time interval to determine a new predicted storage space usage for device storage 330, and subsequently calculate a new free space buffer threshold using the updated predicted storage space size.

In some embodiments, device state monitor 324 may also account for activity of applications 306 that cause storage components to manipulate device storage 330 to add or remove content items 338. For example, device state monitor 324 may first identify application 306 that is running on device 300. Device state monitor 324 may then determine historical storage space utilization associated with application 306 and adjust the free space buffer threshold in accordance with the historical usage of application 306. For example, if application 306 is a camera application that can capture and store bursts of high resolution photos, device state monitor 324 may determine that historical usage of application 306 indicates that when running application 306 can use up storage quickly. Device state monitor may then invoke buffer size calculator module 326 to adjust the free space buffer size in accordance with this utilization.

In some embodiments, device state monitor 324 may also account for applications installed but not active on device 300. Device state monitor 324 may identify an application 306 installed on device 300, and receive space utilization information for application 306 from a server that has been collected from other devices using the same application 306. Device state monitor 324 may then determine a space utilization associated with application 306 based on the received storage utilization of the application on other devices and adjust the free space buffer size accordingly.

Figure 4:
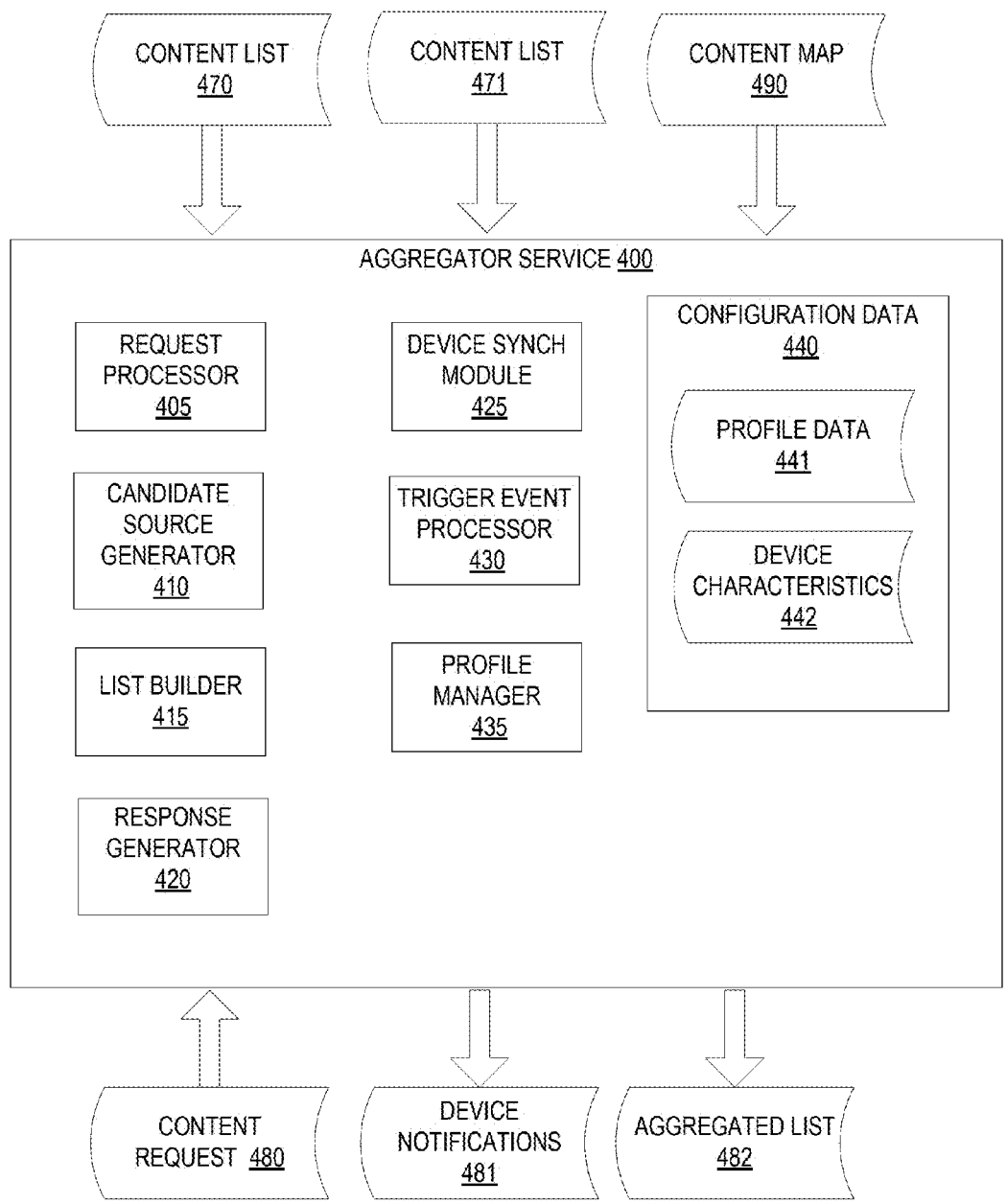
FIG. 4 is a block diagram of a logical view of an aggregator service, in accordance with one embodiment.

FIG. 4 is a block diagram of a logical view of an aggregator service 400, in accordance with one embodiment. Aggregator service 400 may correspond to the aggregator service 104 of FIG. 1 or aggregator service 240 of FIG. 2. In some embodiments, aggregator service 400 may include request processor 405, candidate source generator 410, list builder 415, response generator 420, device synch module 425, trigger event processor 430, profile manager 435, and configuration data 440.

Request processor 405 can receive a content request 480 from one or more devices (e.g., device 102 of FIG. 1, devices 202/204 of FIG. 2, and/or device 300 of FIG. 3) to provide content for a particular user profile associated with the device. Request processor 405 may parse the contents of content request 480, determine the user profile associated with the request, access configuration data 440 to identify data associated with the requesting user profile, and subsequently determine if the unsolicited content storage area on the requesting device is due for a refresh. Request processor 405 may additionally store information received in the content request 480 into configuration data 440. For example, the current state of storage on the device may be stored in device characteristics 442.

Once content request 480 has been parsed and request processor 405 determines that the unsolicited content storage area of the requesting device is ready to be updated, aggregator service 400 may invoke candidate source generator 410 to determine the appropriate electronic content sources to query for electronic content. Candidate source generator may access profile data 441 to identify user preferences associated with the profile (e.g., whether the user prefers audio content or video content, whether the user prefers television shows or movies, etc.). Candidate source generator 410 may then identify particular content source repositories from which to retrieve lists of content. For example, if the user prefers videos, candidate source generator may identify a video content source available to aggregator service 400.

List builder 415 may then send requests to the identified data sources to retrieve lists of content from the individual sources. List builder 415 may receive content lists 470 and 471 from different data sources and create an aggregated list of content based on information stored in configuration data 440. For example, list builder 415 may use information in device characteristics 442 to determine how much free space is available on the device in order to select from content lists 470 and 471. Available free space can represent the amount of storage space on the device that is available for unsolicited digital content plus the amount of storage space that is to be reserved in the free space buffer. In some implementations, list builder 415 can determine the amount of available free space by first sending a request to the device for a report on the amount of available free space. List builder 415 may then receive a response from the device that identifies the amount of available free space. Alternatively, list builder 415 may determine the amount of available free space on a device using other information received from the device. For example, list builder 415 may receive data identifying a total amount of free space on a device that includes the size of a storage component (e.g., device storage 330 of FIG. 3) minus an amount of content other than unsolicited content stored on the storage component. List builder 415 may additionally receive data identifying a free space buffer threshold for a free space buffer on the storage component. List builder 415 may additionally receive data identifying an amount of space on the storage component occupied by unsolicited content (e.g., the amount of space occupied by unsolicited content storage area 334 of FIG. 3). List builder 415 may receive the device related information during device synchronization request received by device synch module 425, during a request for content by request processor 405, or in any similar manner. The List builder 415 may compute the available free space by subtracting the value of the free space buffer threshold and the amount of storage space occupied by the unsolicited content from the total amount of free space on the device.

Additionally, or alternatively, list builder 415 may use information in profile data 441 to identify user preference information to select electronic content items from any of the lists. List builder 415 may additionally receive content map 490 that can include a list of content currently associated with particular profiles and downloaded to particular devices. Content map 490 can be received from the individual sources along with lists 470, 471, from an ownership authority service, or another component of the aggregator service. List builder 415 may determine an aggregated list 482 of unsolicited electronic content for the requesting profile that meets any device or preference constraints detected. The aggregated list 482 may then be formatted and sent to the requesting device by response generator 420.

In an illustrative example, list builder 415 can create aggregated list 482 by selecting at least one electronic content item from lists 470 or 471 according to the content preference for the profile stored in profile data 441 and storage size and/or capabilities of the electronic content items on each list. Each electronic content item from lists 470 and 471 may be given a score and weighted based on user preferences, size of the individual items, device capabilities, or other similar criteria. Electronic content items with the highest weighted score may be selected for aggregated list 482. For example, if a user prefers videos to electronic books, video content may be given a higher weighted score over electronic books. Thus, video content may be selected for aggregated list 482 over audio content. Additionally, list builder 415 may skip items from any of the lists based on the size of the individual content items depending on the amount of free space available on the device. For example, even though a user may prefer videos, processing logic may select a series of electronic books if the amount of free space is not sufficient to store a video file. Conversely, if even though a user may prefer electronic books, if there is a large amount of free space available on the device, processing logic may select videos along with electronic books for the modified list.

Aggregator service 400 may generate a separate aggregated content list 482 for each device associated with a user profile and/or user account. Different aggregated content lists may have overlapping content as well as differing content. Different lists may be created for different devices to account for the different capabilities of those devices and/or different content consumption patterns of a user profile associated with those different devices.

In some embodiments, aggregator service 400 may determine that there are multiple profiles associated with the requesting device. Request processor 405 may parse the request from the device for the active profile (e.g., the profile that was most recently used on the device), and may then invoke profile manager 435 to determine whether a second profile is associated with the device. If a second profile is identified, candidate source generator 410 and list builder 415 may then be invoked to obtain a list of content for the second profile and select at least one unsolicited electronic content item for the second profile. List builder 415 may then add this unsolicited content item to aggregated list 482 to create a modified list to be sent to the device. In one embodiment, a weight is applied to the top item from the list of content for the second profile. The weight may be a weight of less than 1 (e.g., 0.5). The weight may cause the content item for the second profile to be inserted into the aggregated content list for the first profile.

Device synch module 425 can perform synchronization operations apart from specific requests for content received from a device. For example, a device may periodically connect to aggregator service 400 to report the current state of free space available on the device, report the status of electronic content already downloaded (e.g., both solicited and unsolicited electronic content) to the device (e.g., whether the content has been accessed or deleted), profile information updated by the device, or the like. Responsive to receiving device state information from a device, device synch module 425 may determine whether unsolicited electronic content should be deleted from that device, or other devices associated with the same user profile. For example, device synch module 425 may determine, based on device state information, that unsolicited electronic content has been accessed or deleted on a device associated with a particular user profile, and may determine that the unsolicited electronic content should be deleted from any other devices associated with the same profile. Similarly, device synch module 425 may identify all devices associated with a user profile, determine a combined device state for all of the associated devices, and subsequently determine if any unsolicited electronic content items should be deleted from any of the devices. For example, if the user profile associated with the devices has downloaded a number of electronic content items that exceeds a predetermined threshold number, device synch module may determine that one or more unsolicited electronic content items should be deleted from at least one of the devices. Device synch module 425 may additionally send profile and policy updates made by aggregator service 400 to the device to ensure that the state of configuration data 440 is in synch with that of the device.

Trigger event processor 430 can handle notifications received from systems connected with aggregator service 400 that may affect electronic content on devices associated with profiles in profile data 441. Notifications received from ownership servers or content source providers may be received by trigger event processor 430, causing it to send device notifications 481 to connected devices to perform unsolicited content storage area cleanup operations (e.g., to delete particular unsolicited electronic content items from device storage). Notifications may be received by trigger event processor 430 from messaging services such as the Amazon® device messaging framework (ADM), or any other similar method. Trigger event processor 430 may additionally be invoked by device synch module 425 (as noted above) to send notifications 481 to connected devices to perform unsolicited content storage area cleanup operations.

Profile manager 435 may maintain the user profiles that subscribe to aggregator service 440 along with associated preference information, content access history, associated devices, or similar information in profile data 441. Profile manager 435 may store profile related information in configuration data 440 and may additionally be invoked by other components of aggregator service 400 to obtain profile related information when collecting content for aggregated list 482. Profile manager 435 may store device specific information such as available free space, device performance characteristics, or similar information in device characteristics 442. Profile manager 435 may use information received in content map 490 to identify the list of content associated with particular profiles and downloaded to particular devices so that trigger event processor 430 may direct device notifications 481 to the appropriate devices when device cleanup operations are to be performed to remove unsolicited electronic content.

In an illustrative example, aggregator service 400 may cause unsolicited electronic content to be stored on multiple devices associated with a user profile. The unsolicited electronic content may be electronic content that has been downloaded onto the devices without first receiving a download request from the user profile or an application running on the device. Aggregator service 400 may then receive a request from one of the devices associated with the user profile to synchronize the unsolicited electronic content stored on the device with the list of electronic content for the profile. Aggregator service 400 may additionally receive information describing the state of the unsolicited electronic content stored on the device that indicates whether the unsolicited electronic content has been accessed by the profile on the requesting device. In some embodiments, the state information may be included in the synchronization request. Alternatively, the state information may have been previously received and stored in configuration data 440. Aggregator service 400 may determine, using the received information, that at least a portion of the unsolicited electronic content stored on the device has been accessed or deleted by the profile on the device (e.g., the user may have viewed a portion of a video on the requesting device).

Aggregator service 400 may determine that a copy of the unsolicited electronic content is also stored on a second device associated with the profile. In some embodiments, aggregator service 400 may invoke profile manager 435 to access profile data 441 use the information received in content map 490 to determine whether the electronic content has been stored on multiple devices for that profile. Aggregator service 400 may then send a notification to the second device associated with the profile to cause the second device to delete the copy of the unsolicited electronic content.

In an alternative embodiment, aggregator service 400 may determine a combined state of the electronic content for the profile using the state of electronic content for each of the devices associated with the profile. Aggregator service 400 may determine, from the combined state of the electronic content, that a total number of electronic content items having a particular property are distributed across the devices associated with the user profile (e.g., the user profile has 20 videos downloaded across both devices). Aggregator service 400 may then determine that the total number of electronic content items with the particular property that are distributed across the devices exceeds a predetermined electronic content threshold (e.g., the number of videos downloaded exceeds a threshold of 10). Upon determining that the threshold number has been exceeded, aggregator service 400 may send a notification to one or more of the devices to delete an unsolicited electronic content item from the corresponding device storage.

In some embodiments, aggregator service 400 may send the notification to the second device as an ADM notification to force a cleanup of the unsolicited content storage area of a storage component of the device. Alternatively, the notification may be sent as a modified list of electronic content for the profile.

Aggregator service 400 may create a new list of electronic content for the device (following similar steps to those outlined above) and removing from the new list any reference to the copy of the unsolicited electronic content that needs to be deleted. The new list may then be sent to the second device, causing the second device to replace any electronic content in the unsolicited content storage area that has not yet been accessed (e.g., including but not limited to the copy of the electronic content to be deleted) with content on the new list.

In one embodiment, aggregator service 400 updates an aggregated list for a first device associated with a profile based on activity of a second device associated with the profile. For example, if a user watches a large percentage of science fiction films on the second device, then the user profile may be updated to indicate an affinity for science fiction. The aggregated list may then be updated to increase a ranking of science fiction content for the first device. The increased ranking may be applied to content types other than the content types for which the behavior was observed. For example, the rankings of science fiction books may be increased in the aggregated list for the first device in the above mentioned example.

Figure 5:
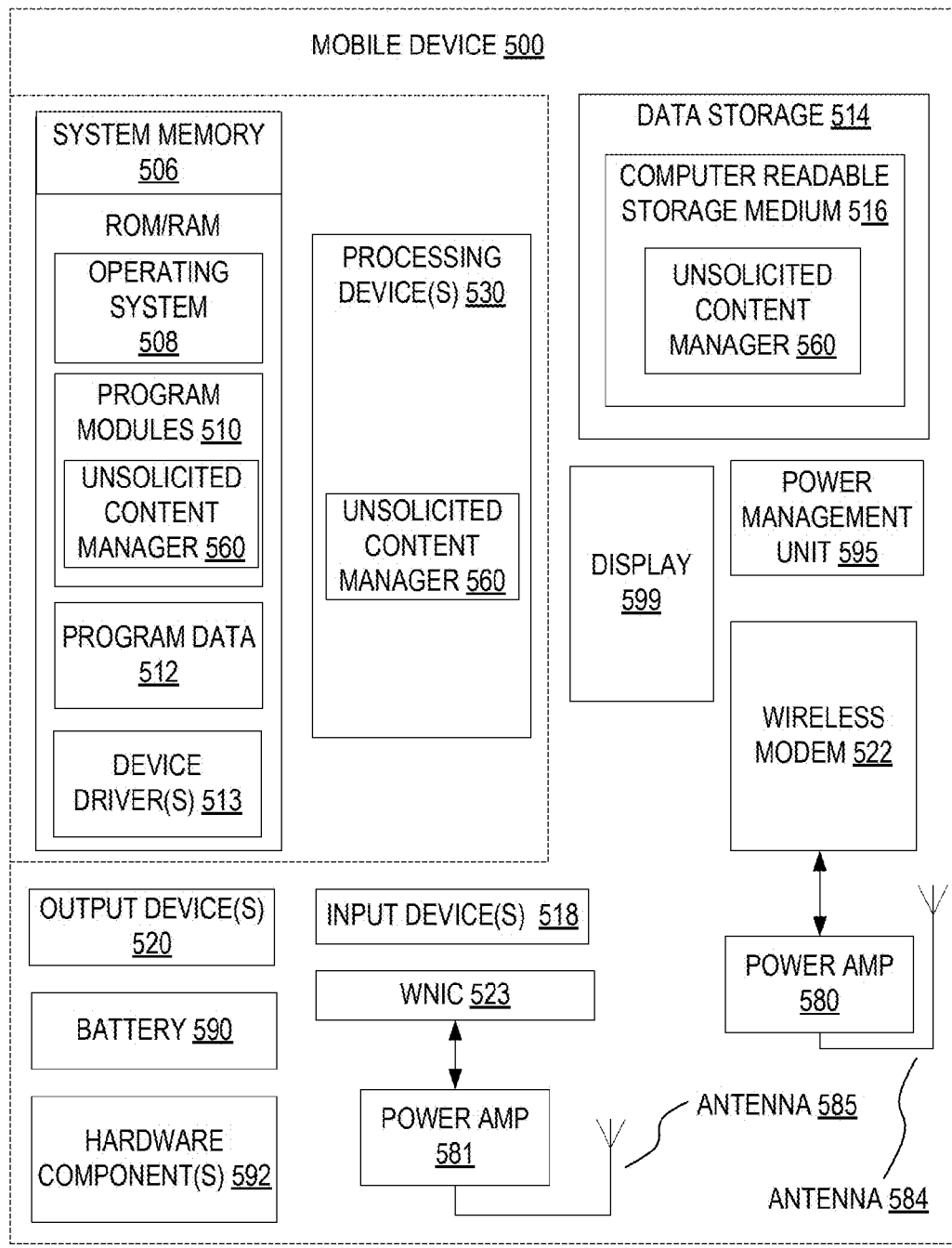
FIG. 5 is a block diagram illustrating an example device with an unsolicited content manager, in accordance with one embodiment.

FIG. 5 is a block diagram illustrating an example device 500 that includes an unsolicited content manager 560. The device 500 may correspond to the device 102 of FIG. 1, devices 202/204 of FIG. 2, and/or device 300 of FIG. 3, and may be any type of mobile computing device such as an electronic book reader, a personal digital assistant (PDA), a mobile phone, a laptop computer, a portable media player, a tablet computer, a camera, a video camera, a remote control, an automobile, a wearable device (e.g., smart watch, body sensor, glasses, etc.), a barcode scanner, a portable speaker system, a netbook, a computing pad, or other battery powered device.

The device 500 includes one or more processing devices 530. Each processing device may be a general purpose processing device (e.g., a microprocessor, central processing unit, or the like) or a special purpose processing device (e.g., an application specific integrated circuit (ASIC), a field programmable gate array (FPGA), a digital signal processor (DSP), network processor, or the like). The device 500 also includes system memory 506, which may correspond to any combination of volatile and/or non-volatile storage mechanisms. The system memory 506 stores information which provides an operating system component 508, various program modules 510 such as for an unsolicited content manager 560, program data 512, device drivers 513, and/or other components. The device 500 performs functions by using the processing device(s) 530 to execute instructions provided by the system memory 506.

The device 500 also includes a data storage component 514 that may be composed of one or more types of removable storage and/or one or more types of non-removable storage. The data storage component 514 includes a computer-readable storage medium 516 on which is stored one or more sets of instructions embodying any one or more of the methodologies or functions described herein. As shown, instructions for the unsolicited content manager 560 may reside, completely or at least partially, within the computer readable storage medium 516, system memory 506 and/or within the processing device(s) 530 during execution thereof by the device 500, the system memory 506 and the processing device(s) 530 also constituting computer-readable media. The device 500 may also include one or more input devices 518 (keyboard, mouse device, specialized selection keys, touchpad, touch screen, etc.) and one or more output devices 520 (displays, printers, audio output mechanisms, etc.).

Device 500 may also include a battery 590 that provides a finite amount of power. The battery 590 may provide a consistent voltage and/or amperage to components of the device 500 until the battery reaches a drained state at which the battery 590 can no longer provide the voltage and/or amperage. When the battery 590 reaches this state, the device may be suspended and/or turned off.

The device 500 may further include a wireless modem 522 to allow the device 500 to communicate via a wireless network (e.g., such as provided by the wireless communication systems) with other computing devices, such as remote computers, the server systems, and so forth. The wireless modem 522 may allow the device 500 to handle both voice and/or non-voice communications (such as communications for text messages, multimedia messages, media downloads, web browsing, etc.) with the wireless communication system 510. The wireless modem 522 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed down-link packet access (HSDPA), long term evolution (LTE), worldwide interoperability for microwave access (WIMAX), etc. The wireless modem 522 may generate signals and send these signals to power amplifier (amp) 580 for amplification, after which they are wirelessly transmitted via antenna 584. In addition to sending data, antenna 584 may also receive data (e.g., network packets), which is sent to wireless modem 522.

The device 500 may further include a wireless network interface controller (WNIC) 523 to allow the device 500 to communicate via a wireless network (e.g., such as provided by the wireless communication systems) with other computing devices, such as remote computers, the server systems, and so forth. The WNIC 523 may be a Wi-Fi NIC, a Bluetooth NIC, a Zigbee NIC, or other wireless NIC.

The WNIC 523 may generate signals and send these signals to power amplifier (amp) 581 for amplification, after which they are wirelessly transmitted via antenna 585. In addition to sending data, antenna 585 may also receive data (e.g., network packets), which is sent to WNIC 523. In one embodiment, the wireless modem 522, the WNIC 523 and the processing device(s) 530 are each discreet devices (e.g., each discreet integrated circuits). Alternatively, one or more of the wireless modem 522, WNIC 523 and processing devices 530 may be logics of a single integrated circuit.

In one embodiment, the device 500 includes a power management unit 595. The power management unit 595 is hardware (e.g., a microcontroller) that governs power functions of the device 500. The power management unit may include a processing device, firmware, software, memory, input/outputs, timers, analog to digital converters, and/or other components. The power management unit 595 may monitor power connections and battery charge, charge the battery 590 when appropriate, control power to other hardware components (e.g., to hardware components 592, wireless modem 522, WNIC 523, system memory 506, data storage 514, and so on), shut down components and/or perform other operations. In one embodiment, the unsolicited content manager 560 may manage electronic content and free space of device 500 (e.g., as described above and corresponding to the methods of FIGS. 7-13, etc.).

Device 500 may additionally include one or more additional hardware components 592, such as a light sensor, hardware accelerators (e.g., audio codecs, graphics processors, etc.), a touch sensor, a proximity sensor, an accelerometer, a gyroscope, and so forth.

Figure 6:
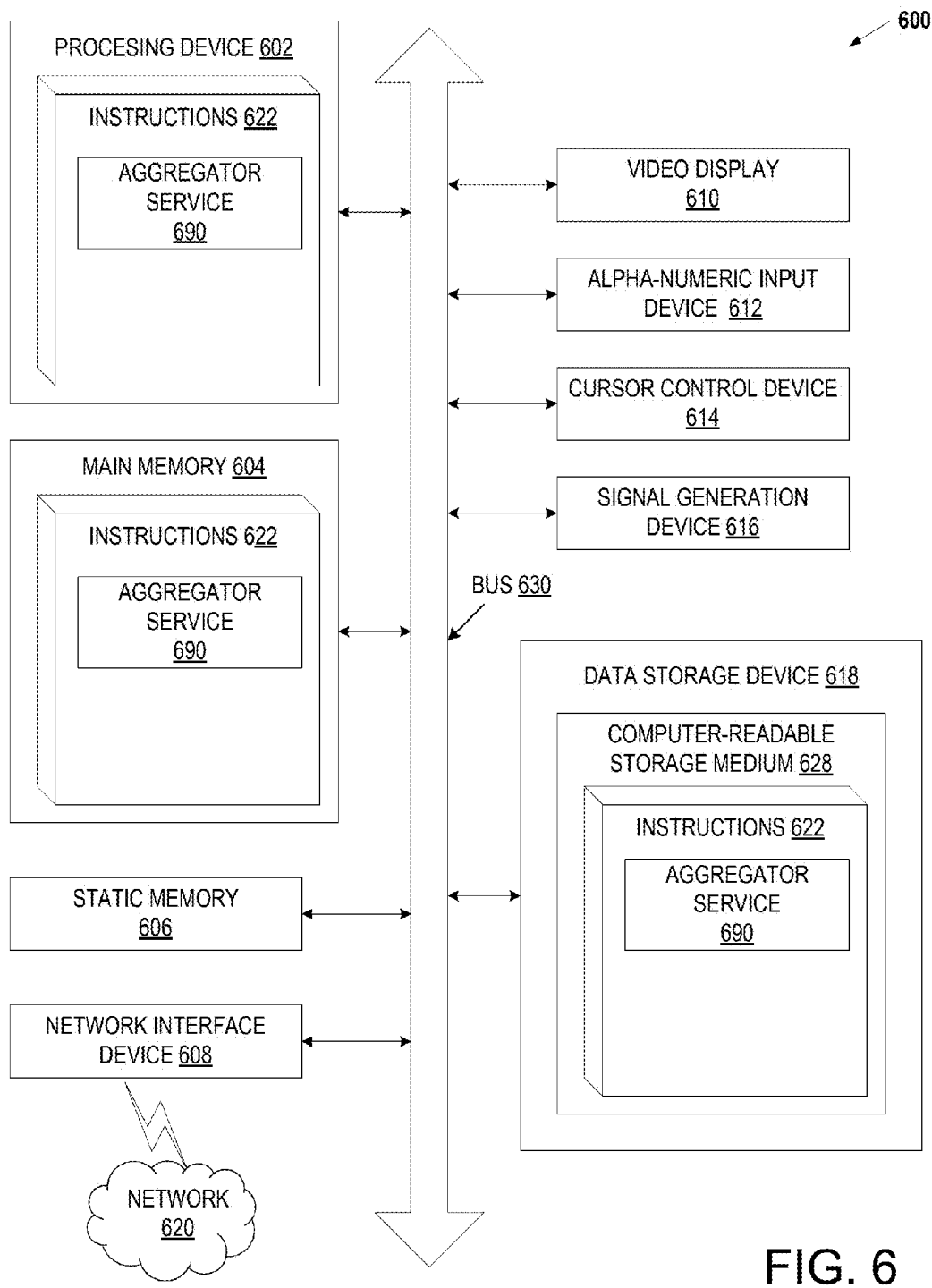
FIG. 6 is a block diagram illustrating a server computing device with an aggregator service, in accordance with one embodiment.

FIG. 6 is a block diagram illustrating a server computing device 600 with a aggregator service 690, in accordance with one embodiment. The server computing device 600 may be connected (e.g., networked) to other machines in a LAN, an intranet, an extranet, and/or the Internet. The server computing device 600 may be a personal computer (PC), a tablet PC, a set-top box (STB), a web appliance, a rackmount server, a network router, a switch or bridge, or any machine capable of executing a set of instructions (sequential or otherwise) that specify actions to be taken by that machine. Further, while a single machine is illustrated, the server computing device 600 shall also be taken to include any collection of machines that individually or jointly execute a set (or multiple sets) of instructions to perform any one or more of the methodologies discussed herein. For example, the server computing device 600 may be one or more devices in a server system. In one embodiment, the server computing device 600 is one node of a cluster that provides a cloud service such as Amazon's® elastic compute cloud (EC2®), Amazon web services (AWS®), or other cloud service.

The server computing device 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage component 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The server computing device 600 may further include a network interface device 608. The server computing device 600 also may include a video display unit 610 (e.g., a liquid crystal display (LCD) or a cathode ray tube (CRT)), an alphanumeric input device 612 (e.g., a keyboard), a cursor control device 414 (e.g., a mouse), and/or a signal generation device 616 (e.g., a speaker).

The data storage component 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the server computing device 600, the main memory 604 and the processing device 602 also constituting machine-readable storage media.

In one implementation, the instructions 622 include instructions for an aggregator service 690 (e.g., aggregator service 104 of FIG. 1, aggregator service 240 of FIG. 2, and/or aggregator service 400 of FIG. 4) and/or a software library containing methods that call modules in an aggregator service (e.g., corresponding to the methods of FIGS. 14-18, etc.). While the machine-readable storage medium 628 is shown in an example implementation to be a single medium, the term "machine-readable storage medium" should be taken to include a single medium or multiple media (e.g., a centralized or distributed database, and/or associated unsolicited content storage areas and servers) that store the one or more sets of instructions. The term "machine-readable storage medium" shall also be taken to include any medium other than a carrier wave that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

FIGS. 7-13 are flow diagrams of various embodiments of methods performed by a device to manage a free space buffer threshold. The methods are performed by processing logic that may include hardware (circuitry, dedicated logic, etc.), software (such as is run on a general purpose computer system or a dedicated machine), firmware, or some combination thereof. In one implementation, the methods may be performed by device 102 of FIG. 1, unsolicited content manager 230 of devices 202-204 of FIG. 2, unsolicited content manager 320 of device 300 of FIG. 3, and/or unsolicited content manager 560 of device 500 of FIG. 5.

For simplicity of explanation, the methods are depicted and described as a series of acts. However, acts in accordance with this disclosure can occur in various orders and/or concurrently, and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 7:
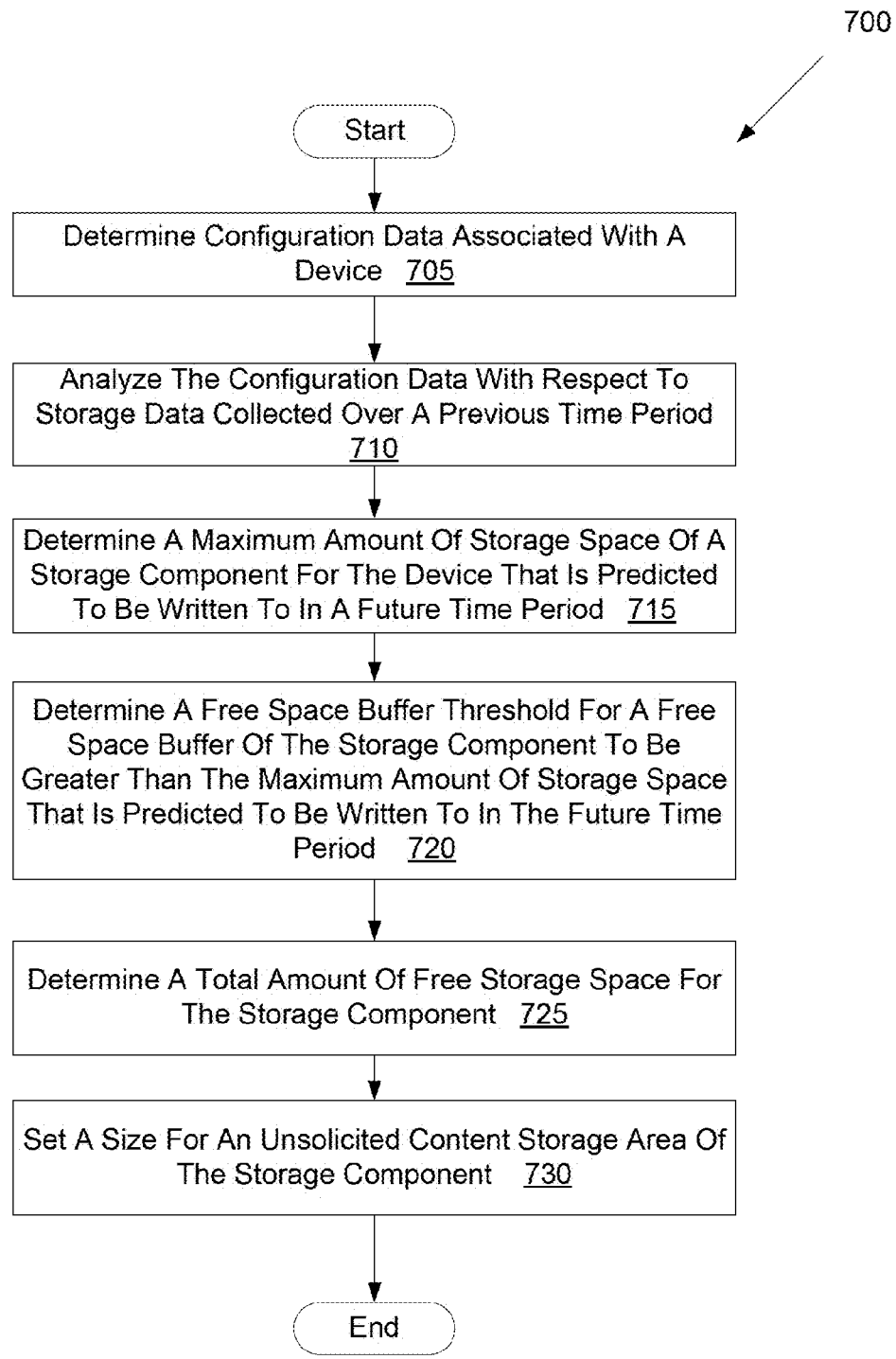
FIG. 7 is a flow diagram of an embodiment for a method of predicting the size of a free space buffer threshold.

FIG. 7 is a flow diagram of an embodiment for a method 700 of predicting the size of a free space buffer threshold. At block 705 of method 700, processing logic determines configuration data associated with a device. This may include performing a lookup on a list, file or data structure that includes configuration settings and/or defaults. Configuration data may include a minimum write speed associated with a storage component of the device (e.g., the rate at which device may write data to device storage), a minimum free space buffer threshold associated with the storage component of the device (e.g., a seed threshold that can be received by the content delivery system as a default setting), a low storage threshold for the storage component of the device (e.g., the minimum amount of free space required by the operating system to function), or other similar information.

At block 710, processing logic analyzes the configuration data with respect to storage usage data collected over a previous time period. In some implementations, this may include comparing a portion of the configuration data (e.g., a default or minimum write speed) to a portion of the storage usage data (e.g., an observed write speed). For example, processing logic may monitor device storage over a particular period of time (e.g., every 60 seconds, every 120 seconds, every 30 seconds, and so on) to determine statistics related to write speed, total device storage used, total free space available, etc. for use in the analysis. At block 715, processing logic determines a maximum amount of storage space of a storage component for the device to be written to in a future time period. The future time period may be a time interval at which the device analyzes the state of the storage usage of the device (e.g., that shows how much space is remaining on a storage component of the device). In some implementations, this may be performed as described above with respect to device state monitor 324 of FIG. 3. In some implementations, processing logic may determine the maximum amount of storage as described below with respect to FIG. 10.

At block 720, processing logic determines a free space buffer threshold for a free space buffer of the storage component of the device to be greater than the maximum amount of storage space that is predicted to be written to in the future time period. In some implementations, processing logic may add a predetermined fixed value to the value of the maximum amount of storage space to be consumed in the future time period to set the free space buffer threshold. For example, processing logic may add a fixed 250 MB value to the maximum to yield the free space buffer threshold. Alternatively, processing logic may calculate a value to be added to the maximum. For example, processing logic may determine an average file size for electronic content items on the device. Processing logic may then add the average file size value to the maximum to account for the addition of a file to device storage. At block 725, processing logic determines a total amount of free storage space for the storage component of the device. Processing logic may determine the total amount of free storage space by accessing file system information stored on the device. At block 730, processing logic sets a size for an unsolicited content storage area of the storage component of the device. In some implementations, the unsolicited content storage area size may be at least the total amount of free storage space available in the storage component of the device minus the free space buffer threshold value. Total free space may represent the total size of a storage component (or group of storage components) minus an amount of space occupied by standard content). In an illustrative example, the unsolicited content storage area may correspond to an area of the storage component of the device that is to be used for storage of unsolicited electronic content for a user profile. After block 730, the method of FIG. 7 terminates.

Figure 8:
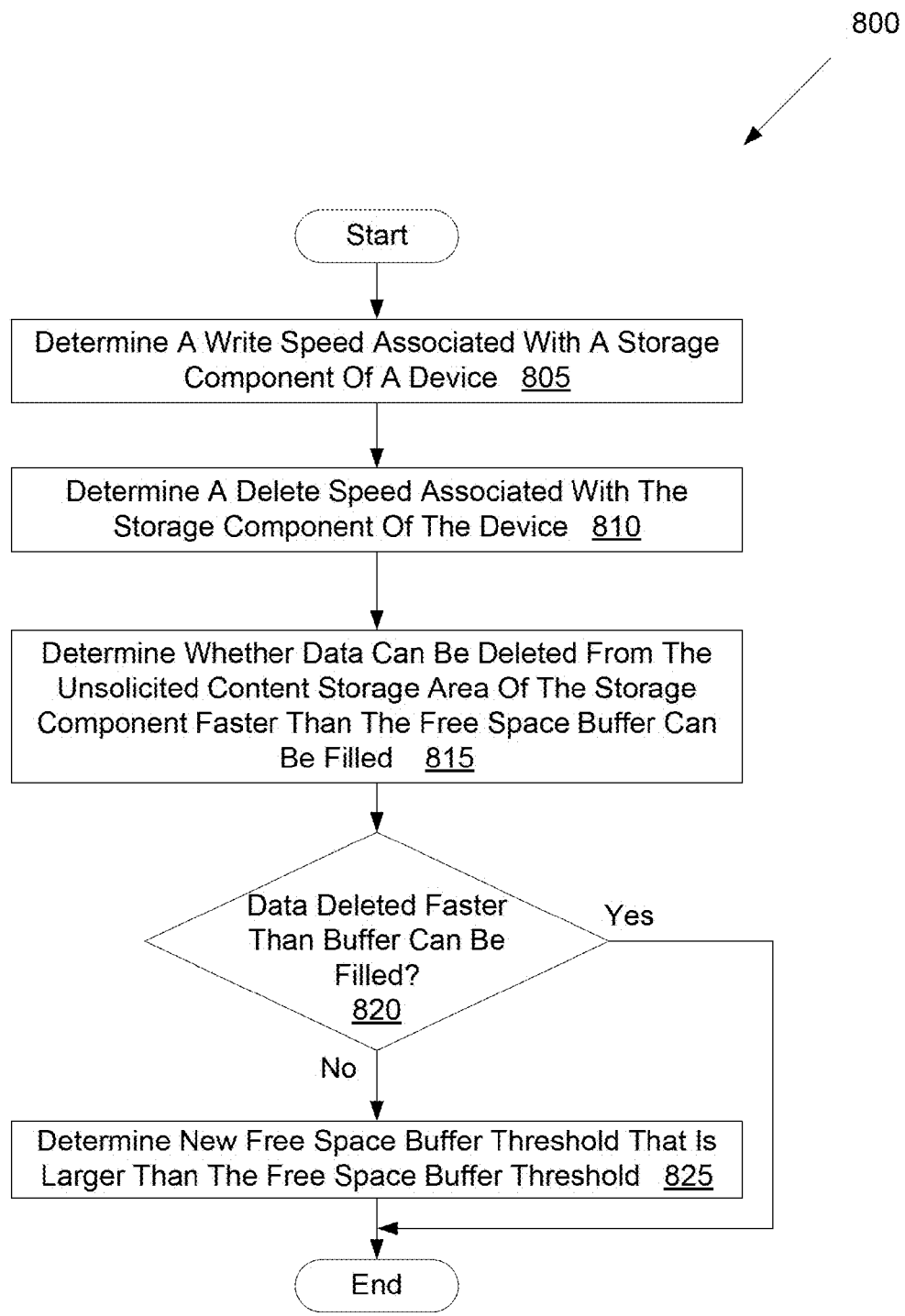
FIG. 8 is a flow diagram of an embodiment for a method of increasing a free space buffer threshold when data is written faster than it can be deleted.

FIG. 8 is a flow diagram of an embodiment for a method 800 of increasing a free space buffer threshold when data is written faster than it can be deleted. At block 805 of method 800, processing logic determines a write speed associated with the storage space of a device. In some implementations, the write speed may be the larger of a minimum default write speed associated with the device and an observed write speed measured over a previous time period. The observed write speed may be computed by incrementally decreasing a previously recorded maximum write speed over successive monitoring time periods. At each monitoring interval, processing logic may determine a new observed write speed, and additionally compare the new observed write speed to a weighted previous maximum write speed. The weight that is applied to the previous maximum write speed may be decreased over time based on how long it has been since the previous maximum write speed was recorded. The weighted observed write speed may be the larger of the new observed write speed and the weighted previous maximum write speed. Thus, an observed write speed that is calculated during a monitoring period where a greater amount of data has been written to storage will not cause the determined buffer threshold to remain inappropriately large for successive monitoring periods where the actual storage space usage decreases. In some implementations, this may be performed as described above with respect to device state monitor 324 of FIG. 3. At block 810, processing logic determines a delete speed associated with the storage space of the device (e.g., the rate at which data may be deleted from the storage space of the device). In some implementations, processing logic may monitor the storage component to obtain statistical information regarding input and output operations associated with the storage component in order to determine the delete speed.

At block 815, processing logic determines whether data can be deleted from the unsolicited content storage area faster than the free space buffer can be filled. In an illustrative example, the unsolicited content storage area corresponds to an area of the storage component of the device that is to be used for storage of unsolicited content. In some implementations, processing logic may make this determination by comparing the observed write speed to the delete speed. If the delete speed is faster than the observed write speed, then data can be deleted faster than the buffer can be filled.

In some implementations, processing logic may make the determination by first determining a first rate at which solicited content is added to the free space buffer on the storage component. This rate may be an amount of data written to the storage component in an instance of a monitoring time interval. For example, if the monitoring time interval is 60 seconds, the rate may be determined to be the amount of data written during a 60 second time period (e.g., in megabytes (MB) per minute). Processing logic may then determine that deletion of the unsolicited content from the unsolicited content storage area of the storage component is performed at a second rate, where the second rate is an amount of data that is deleted in the instance of the time interval. Processing logic may then determine that the first rate (the rate at which solicited content is added) is higher than the second rate (the rate at which unsolicited content is deleted) by a rate delta (e.g., the difference between the two rates). For example, if the first rate is 4 MB/minute and the second rate is 3 MB/minute, the rate delta could be 1 MB/minute. Processing logic may then determine a delta amount of storage space associated with the rate delta. The delta amount of storage may be determined over the time interval using the rate delta. For example, where the rate delta is 1 MB/minute, the delta amount of storage over a 1 minute period could be 1 MB.

At block 820, processing logic branches based on the determination at block 815. If data can be deleted faster than the free space buffer can be filled, the method of FIG. 8 terminates, confirming the size of the free space buffer threshold. If not, processing logic proceeds to block 825. At block 825, processing logic determines a new free space buffer threshold that is larger than the current free space buffer threshold (e.g., increases the size of the free space buffer threshold). In some implementations, processing logic may increase the free space buffer threshold size by a fixed amount (e.g., 4 MB). Alternatively, processing logic may increase the buffer threshold size by a percentage value (e.g., by 10 percent of its current value). In some implementations, processing logic may determine the new free space buffer threshold that is larger than the previous free space buffer threshold by increasing the free space buffer threshold by at least the delta amount of storage space from block 815. In the above example, 1 MB may be added to the previous free space buffer threshold to account for the rate delta for the subsequent time interval. Processing logic may then determine a new size for the unsolicited content storage area that is smaller than the previous size of the unsolicited content area. For example, processing logic may determine the new size to be equal to the total amount of free storage on the storage component minus the new free space buffer threshold. After block 825, the method of FIG. 8 terminates.

Figure 9:
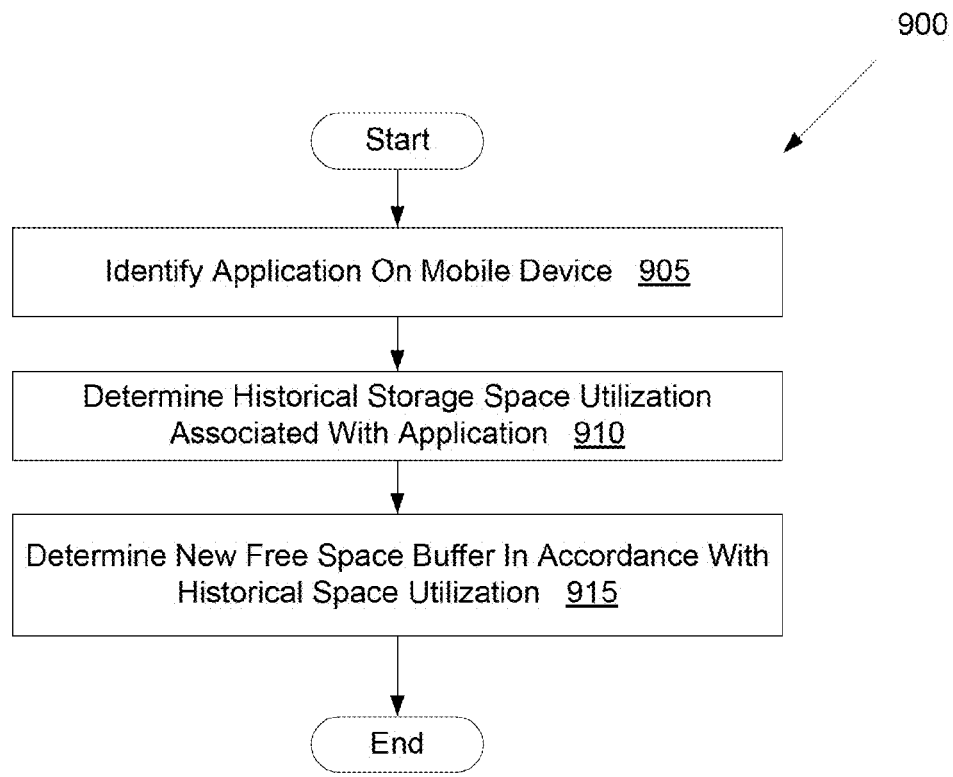
FIG. 9 is a flow diagram of an embodiment for a method of adjusting a free space buffer threshold using historical information associated with an application.

FIG. 9 is a flow diagram of an embodiment for a method 900 of adjusting a free space buffer threshold using historical information associated with an application. At block 905 of method 900, processing logic identifies an application on a device. Processing logic may identify an application that is running on the device, or an application that is installed on the device, but not currently running.

At block 910, processing logic determines historical storage space utilization associated with the application. In some implementations, processing logic may determine the historical storage space utilization for the application using historical information associated with the active user profile of the device (e.g., the user currently using the device). Alternatively, processing logic may determine the historical storage space utilization using historical information associated with other user profiles associated with the device (e.g., other users who have used the device but are not currently using the device), or historical information associated with other devices. For example, if a running application is a camera application that can capture and store bursts of high resolution photos, processing logic may determine that historical usage of the application indicates that when running, the application can use up storage quickly (e.g., by storing large amounts of high resolution photos in a very short period of time).

At block 915, processing logic determines a new free space buffer in accordance with the historical space utilization from block 910. For example, when the aforementioned camera app is running, processing logic may increase the free space buffer size to account for bursts of photos being saved. Similarly, if the camera app is installed but not running, processing logic may increase the free space buffer size to account for expected camera activity should the application be invoked at some time in the future. In some implementations, processing logic may increase the free space buffer threshold size by a fixed amount (e.g., 4 MB). Alternatively, processing logic may increase the buffer threshold size by a percentage value (e.g., by 10 percent of its current value). After block 915, the method of FIG. 9 terminates.

Figure 10:
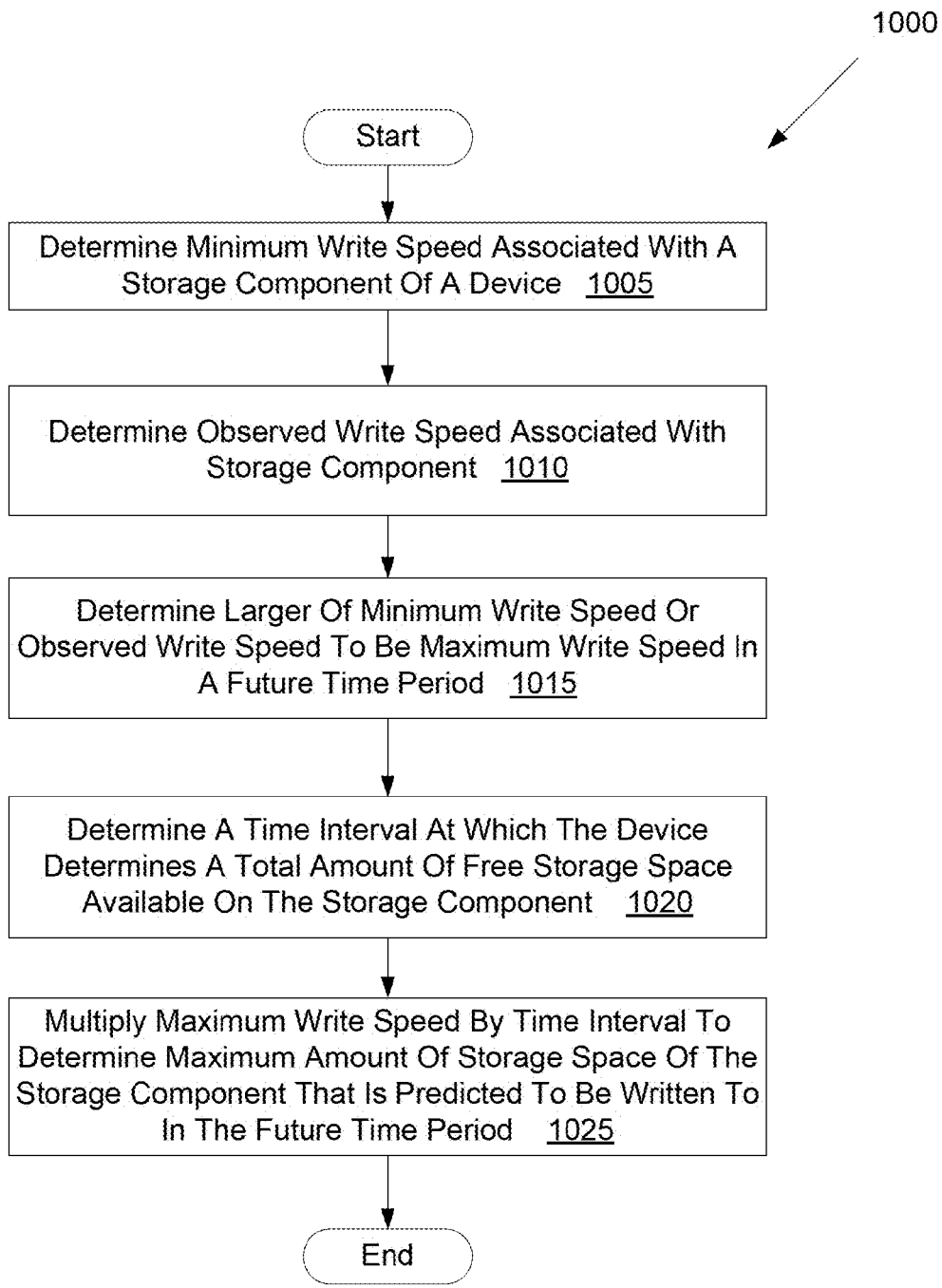
FIG. 10 is a flow diagram of an embodiment for a method of determining a predicted maximum amount of storage space of a device to be consumed during a future time period.

FIG. 10 is a flow diagram of an embodiment for a method 1000 of determining a predicted maximum amount of storage space of a device to be consumed during a future time period. At block 1005 of method 1000, processing logic determines a minimum write speed associated with a storage component of a device. At block 1010, processing logic determines an observed write speed associated with the storage component of the device. In some implementations, the observed write speed may be a weighted observed write speed measured over a previous time period. The weighted observed write speed may be computed by incrementally decreasing a previously recorded maximum write speed over successive monitoring time periods. At each monitoring cycle (e.g., after each instance of a time monitoring interval), processing logic may determine a recent write speed, (e.g., a write speed over an instance of the time interval), generate a reduced observed write speed by applying a weight of less than one to a previously measured observed write speed, and compare the recent write speed to the reduced observed write speed to determine the new observed write speed. The weight that is applied to the previous maximum write speed may be first set to a weight of less than one, and decreased over time based on how long it has been since the previous maximum write speed was recorded. The new observed write speed may be the larger of the reduced observed write speed and the recent write speed. Thus, an observed write speed that is calculated during a monitoring period where a greater amount of data has been written to storage will not cause the determined buffer threshold to remain inappropriately large for successive monitoring periods where the actual storage space usage decreases. In some implementations, this may be performed as described above with respect to device state monitor 324 of FIG. 3. At block 1015, processing logic determines a larger of the minimum write speed or the observed write speed to be the maximum write speed in the future time period.

At block 1020, processing logic determines a time interval (e.g., a 60 second interval) at which the device determines a total amount of free storage space available on the storage component of the device. At block 1025, processing logic multiplies the maximum write speed by the time interval to determine the maximum amount of storage space of the storage component of the device that is predicted to be written to in the future time period. After block 1025, the method of FIG. 10 terminates.

Figure 11:
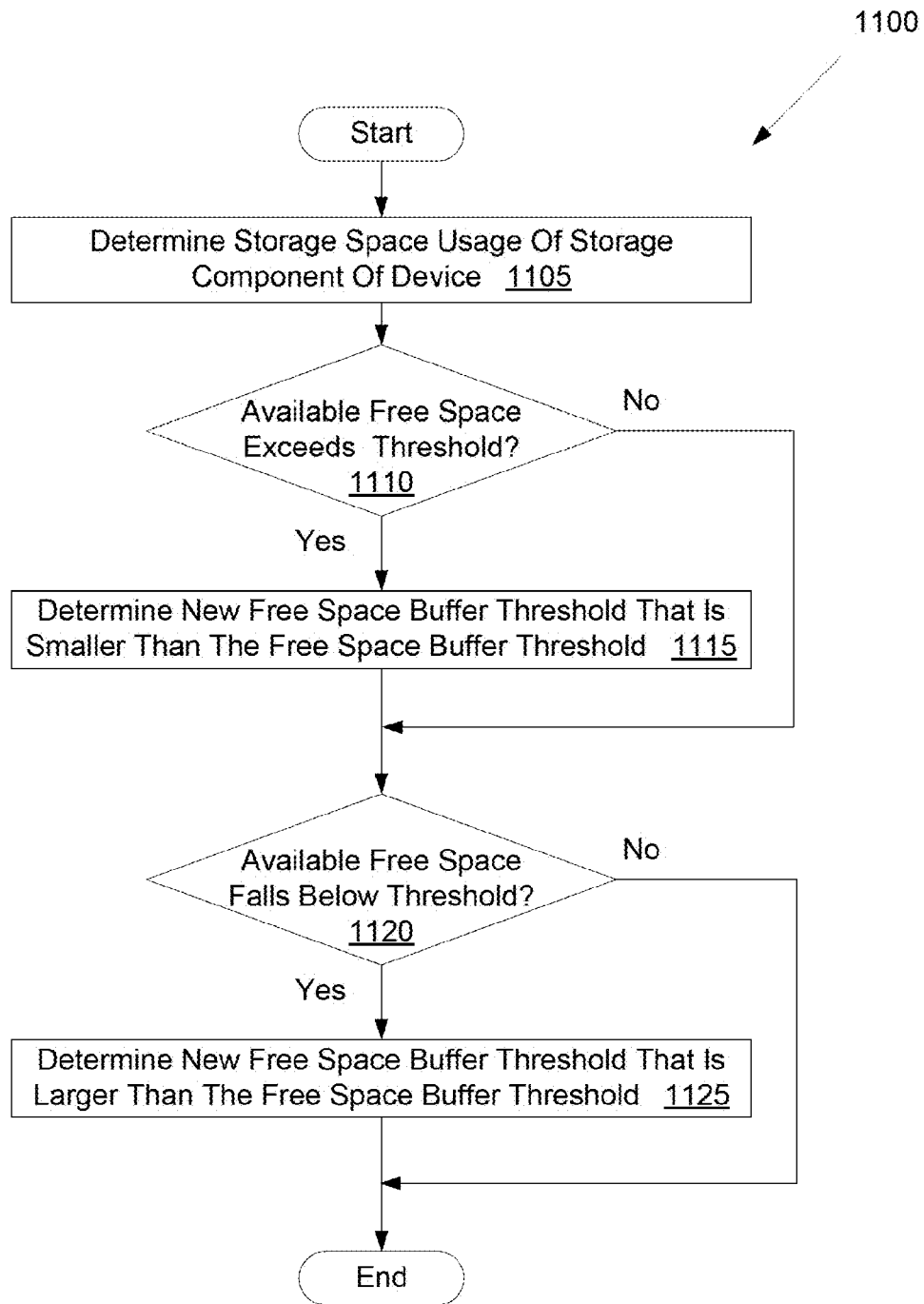
FIG. 11 is a flow diagram of an embodiment for a method of adjusting a size of a free space buffer threshold.

FIG. 11 is a flow diagram of an embodiment for a method 1100 of adjusting the size of the free space buffer threshold. At block 1105 of method 1100, processing logic determines the storage space usage of a storage component of a device over a new time period. In an illustrative example, the storage space usage may include writes to the storage component and deletions from the storage component. Determining the storage space usage may include determining a total free storage space for a storage component (space that remains after subtracting size of standard content from size of storage component) as well as determining an available free storage space for the storage component (space that remains after subtracting size of the unsolicited content storage area from the total free space). A size of the unsolicited content storage area may be dynamic. As additional standard content is added to the storage component the total free storage space will shrink and the size of the unsolicited content storage area will be reduced accordingly. As standard content is deleted from the storage component, the total free storage space will grow, and the size of the unsolicited content storage area will be increased accordingly. In some implementations, this may be performed as described above with respect to device storage monitor 340 of FIG. 3.

At block 1110, processing logic determines based on the storage space usage of the storage component whether the amount of available free space on the storage component of the device exceeds the free space buffer threshold (e.g., whether the amount of available free space on the device exceeds the minimum amount of free space needed). If so, processing logic continues to block 1115. Otherwise, processing proceeds to block 1120. At block 1115, processing logic determines a new free space buffer threshold that is smaller than the current free space buffer threshold (e.g., decreases the free space buffer threshold). In some implementations, processing logic may decrease the free space buffer threshold size by a fixed amount (e.g., 4 MB). Alternatively, processing logic may reduce the buffer threshold size by a percentage value (e.g., by 10 percent of its current value). At block 1120, processing logic determines based on the storage space usage whether the available free space on the device falls below the free space buffer threshold (e.g., whether the amount of free space on the device is less than the minimum amount of free space needed). If so, processing continues to block 1125. Otherwise, the method of FIG. 11 terminates. At block 1125, processing logic determines a new free space buffer threshold that is larger than the current free space buffer threshold (e.g., increases the free space buffer threshold). In some implementations, processing logic may increase the free space buffer threshold size by a fixed amount (e.g., 4 MB). Alternatively, processing logic may increase the buffer threshold size by a percentage value (e.g., by 10 percent of its current value). After block 1125, the method of FIG. 11 terminates.

Figure 12:
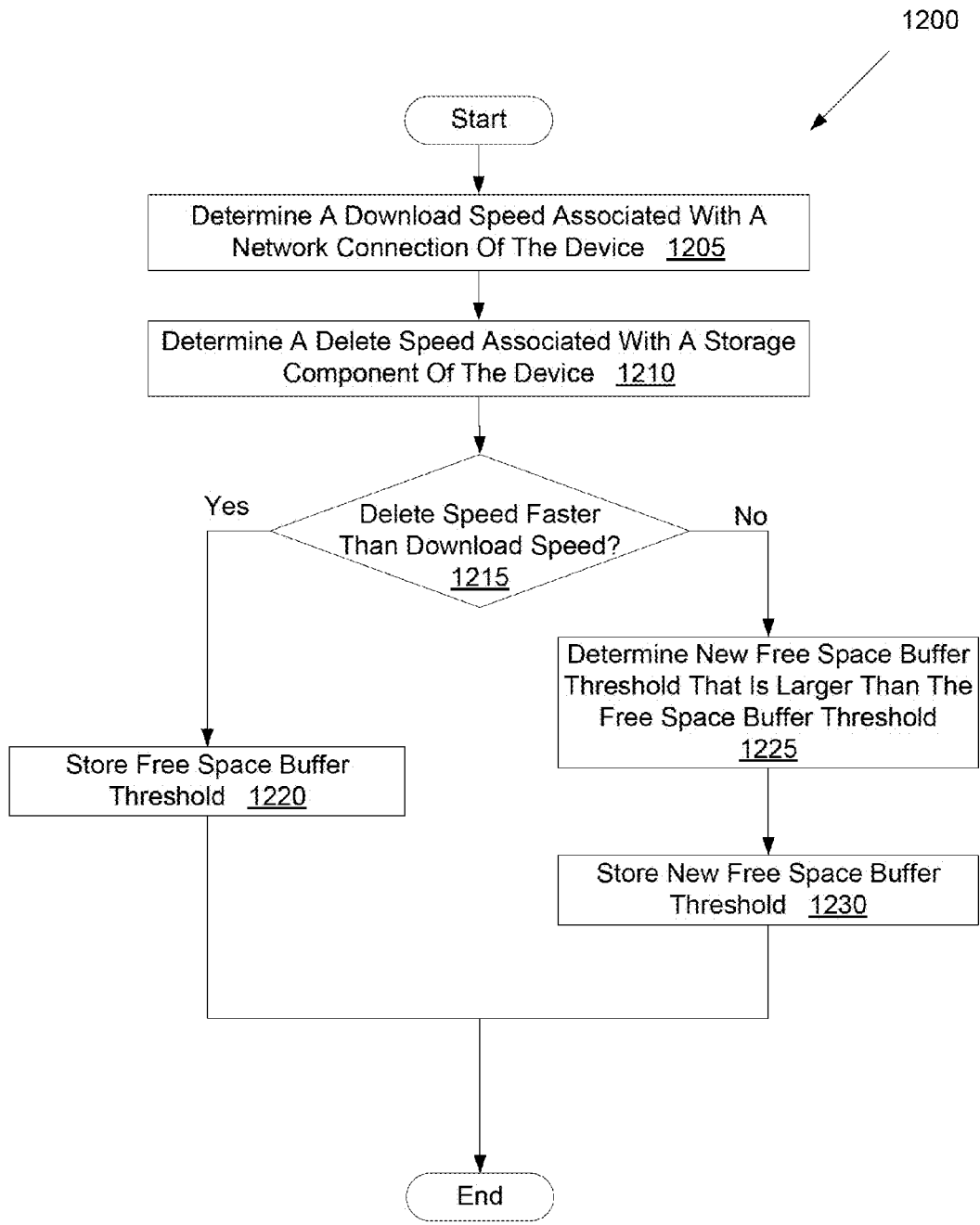
FIG. 12 is a flow diagram of an embodiment for a method of determining a free space buffer threshold according to a device download speed.

FIG. 12 is a flow diagram of an embodiment for a method 1200 for determining a free space buffer threshold according to a device download speed. At block 1205 of method 1200, processing logic determines a download speed associated with a network connection of a device. Processing logic may make this determination by collecting statistical information when electronic content is downloaded to the device and maintaining an average download speed in a local storage location. Alternatively, processing logic may determine the download speed dynamically by sending and receiving packets to a network location periodically while the device is active. At block 1210, processing logic determines a delete speed associated with a storage component of the device (e.g., the rate at which data may be deleted from the storage space of the device). In some implementations, processing logic may monitor the storage space of the device to obtain statistical information regarding input and output operations associated with the storage space in order to determine the delete speed. At block 1215, processing logic determines whether the delete speed is faster than the download speed. If so (e.g., indicating that the free space buffer threshold may be sufficient because electronic content may be deleted from the device faster than it can be added), processing proceeds to block 1220 where processing logic confirms the free space buffer threshold. Otherwise (e.g., indicating that the free space buffer threshold may be insufficient because electronic content may be downloaded faster than it may be deleted), processing proceeds to block 1225, where processing logic increases the free space buffer threshold. At block 1230, processing logic then stores the new free space buffer threshold. Processing logic may store the new free space buffer threshold in a memory space, in a configuration file, or in any other manner. After either block 1220 or block 1230, the method of FIG. 12 terminates.

Figure 13:
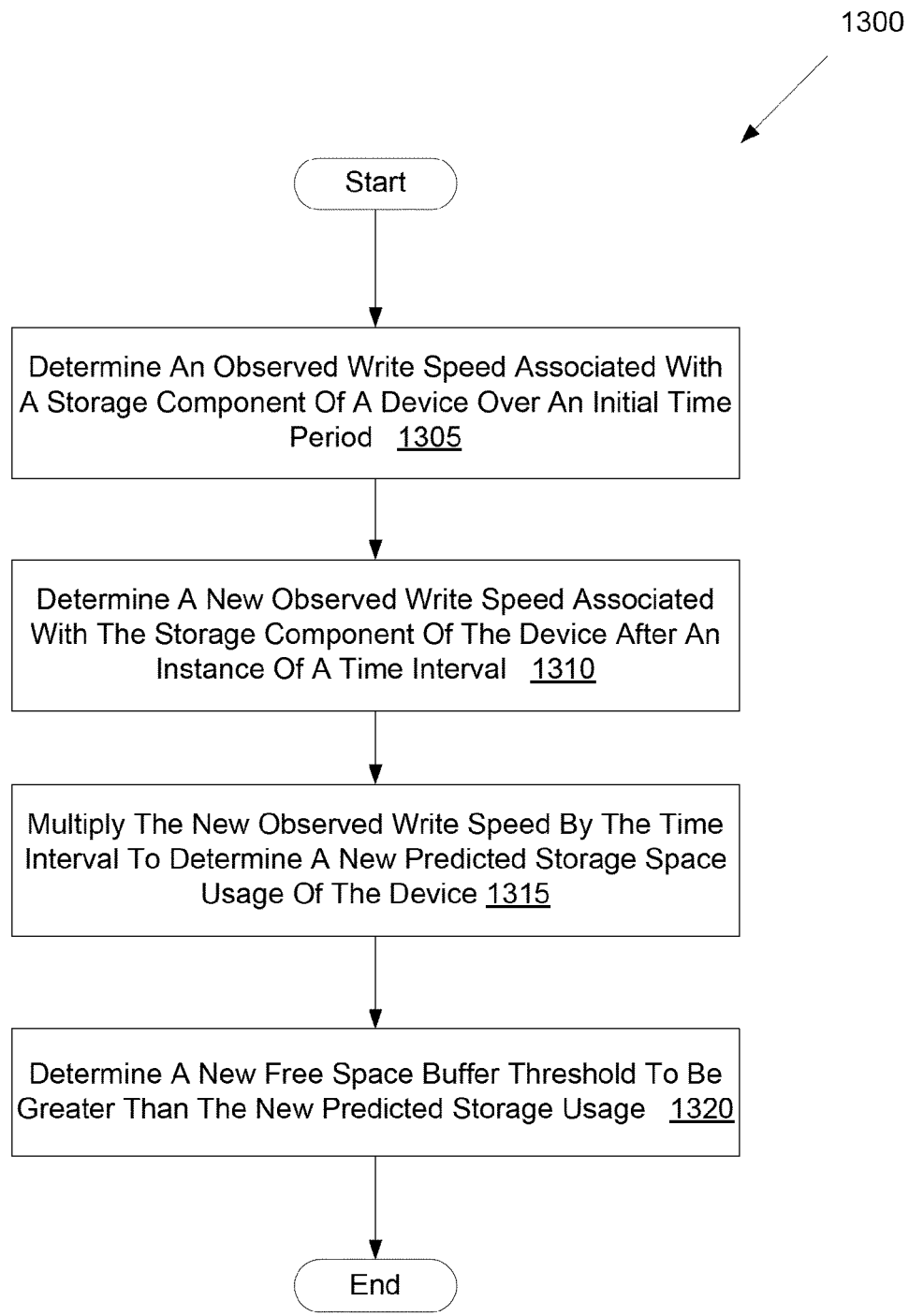
FIG. 13 is a flow diagram of an embodiment for a method of modifying a free space buffer threshold based on changes in observed storage usage.

FIG. 13 is a flow diagram of an embodiment for a method 1300 of modifying a free space buffer threshold based on changes in observed storage usage. At block 1305 of method 1300, processing logic determines an observed write speed associated with a storage space of a device over an initial time period. In some implementations the observed write speed may be an initial write speed of the device associated with configuration settings. Alternatively, the observed write speed may be a weighted observed write speed over the initial time period. The weighted observed write speed may be used to incrementally decrease a previously calculated write speed over successive monitoring time intervals. Thus, an observed write speed that is calculated during a monitoring time interval where a greater amount of data has been written to storage will not cause the determined buffer threshold space to remain inappropriately large for successive monitoring periods where the actual storage space usage decreases. In some implementations, this may be performed as described above with respect to device state monitor 324 of FIG. 3.

At block 1310, processing logic determines a new observed write speed associated with the storage space of the device after the instance of a time interval. In some implementations, processing logic may first determine a recent write speed over the instance of the time interval (e.g., the measured write speed associated with the storage component over the time interval). Processing logic may then generate a reduced observed write speed by applying a weight of less than one to the previously measured observed write speed. Processing logic may then determine the new observed write speed to be the larger of the reduced observed write speed and the recent write speed. In some implementations, this may be performed as described above with respect to device state monitor 324 of FIG. 3. At block 1315, processing logic multiplies the new observed write speed by the time interval to determine a new predicted storage space usage of the storage component. At block 1320, processing logic determines a new free space buffer threshold to be greater than the new predicted storage space usage. After block 1320, the method of FIG. 11 terminates.

FIGS. 14-20 are flow diagrams of various embodiments of methods related to managing the content for multiple profiles and multiple devices by an aggregator service. The methods are performed by processing logic that may include hardware (circuitry, dedicated logic, etc.), software (such as is run on a general purpose computer system or a dedicated machine), firmware, or some combination thereof. In one implementation, the methods may be performed by a server system (e.g., by a cloud service provided by a server system). Example systems that may perform the methods of FIGS. 14-20 include aggregator service 104 of FIG. 1, aggregator service 240 of FIG. 2, aggregator service 400 of FIG. 4, and aggregator service 690 of server computing device 600 of FIG. 4.

Figure 14:
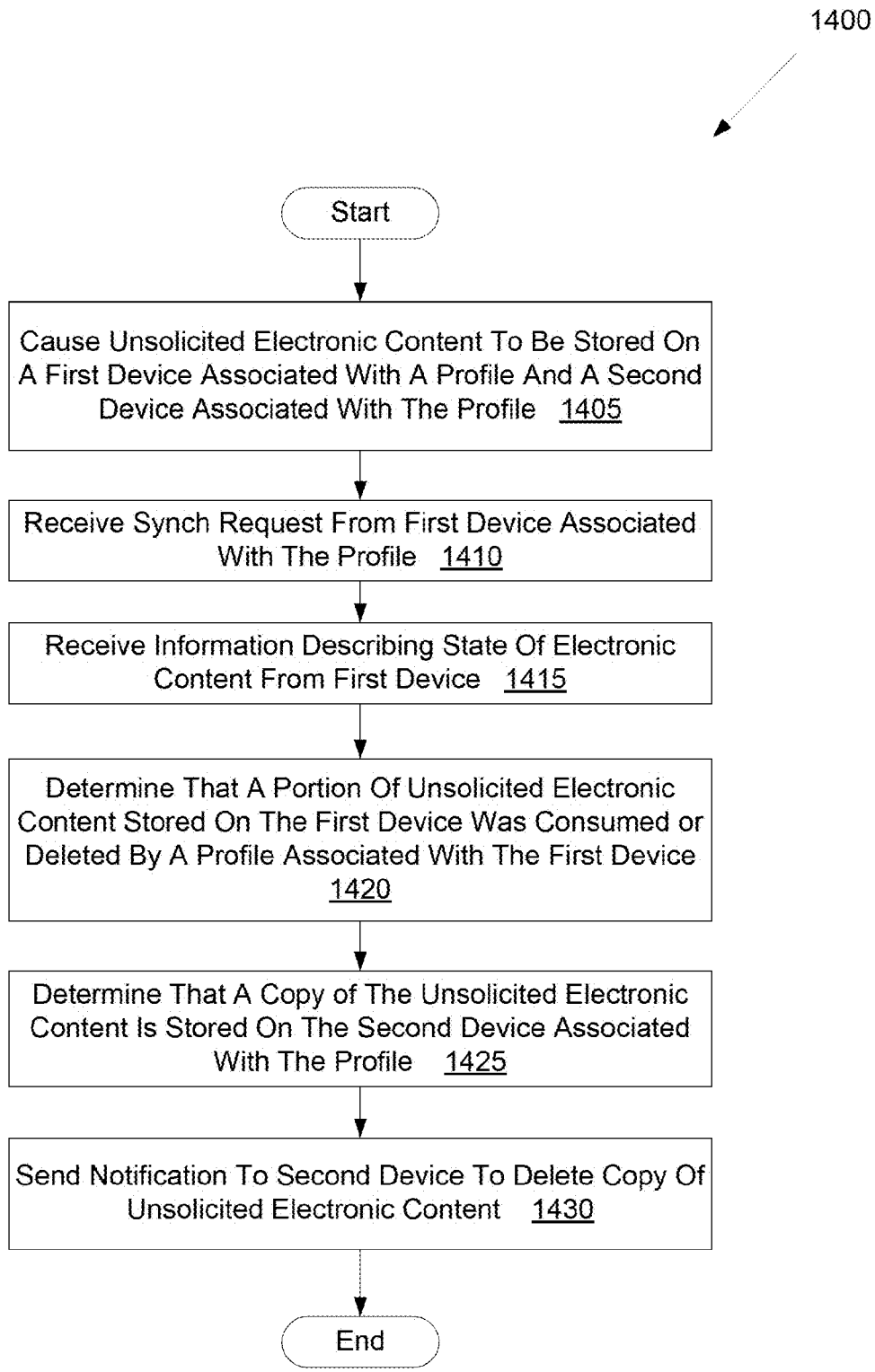
FIG. 14 is a flow diagram of an embodiment for a method of managing content across multiple devices.

FIG. 14 is a flow diagram of an embodiment for a method 1400 of managing electronic content across multiple devices. At block 1405 of method 1400, processing logic causes unsolicited electronic content to be stored on a first device associated with a profile and a second device associated with a profile. Unsolicited electronic content may be electronic content that has been downloaded onto the device without first receiving a download request from the profile or an application running on the device. In some implementations, this may be performed as described above with respect to aggregator service 400 of FIG. 4. At block 1410, processing logic receives a synchronization request from the first device associated with the profile. In some implementations, the synchronization request may be a request to synchronize electronic content stored on the device with a list of content for the profile. In some implementations, the synchronization request may be received as described above with respect to device synch module 425 of aggregator service 400 of FIG. 4. At block 1415, processing logic receives state information from the first device. In some implementations the state information indicates whether the electronic content (e.g., both solicited and unsolicited electronic content) has been accessed by the profile on the first device. In some implementations, the state information may be included in the synchronization request. Alternatively, the state information may have been previously received and stored in configuration data. In some implementations, the state information may be received as described above with respect to device synch module 425 of aggregator service 400 of FIG. 4.

At block 1420, processing logic determines that a portion of the unsolicited electronic content stored on the first device has been accessed or deleted by the profile on the first device (e.g., a user may have viewed a portion of a video on the requesting device). In some implementations, the state may be determined as described above with respect to device synch module 425 of aggregator service 400 of FIG. 4. At block 1425, processing logic determines that a copy of the unsolicited electronic content is stored on a second device associated with the profile. In some implementations, this be determined as described above with respect to profile manager 435 of aggregator service 400 of FIG. 4. At block 1430, processing logic sends a notification to the second device to delete the copy of the unsolicited electronic content from the second device. In some implementations, this may be performed as described above with respect to trigger event processor 430 of aggregator service 400 of FIG. 4. In some implementations, processing logic may send the notification to the second device as described below with respect to FIG. 15. After block 1430, the method of FIG. 14 terminates.

Figure 15:
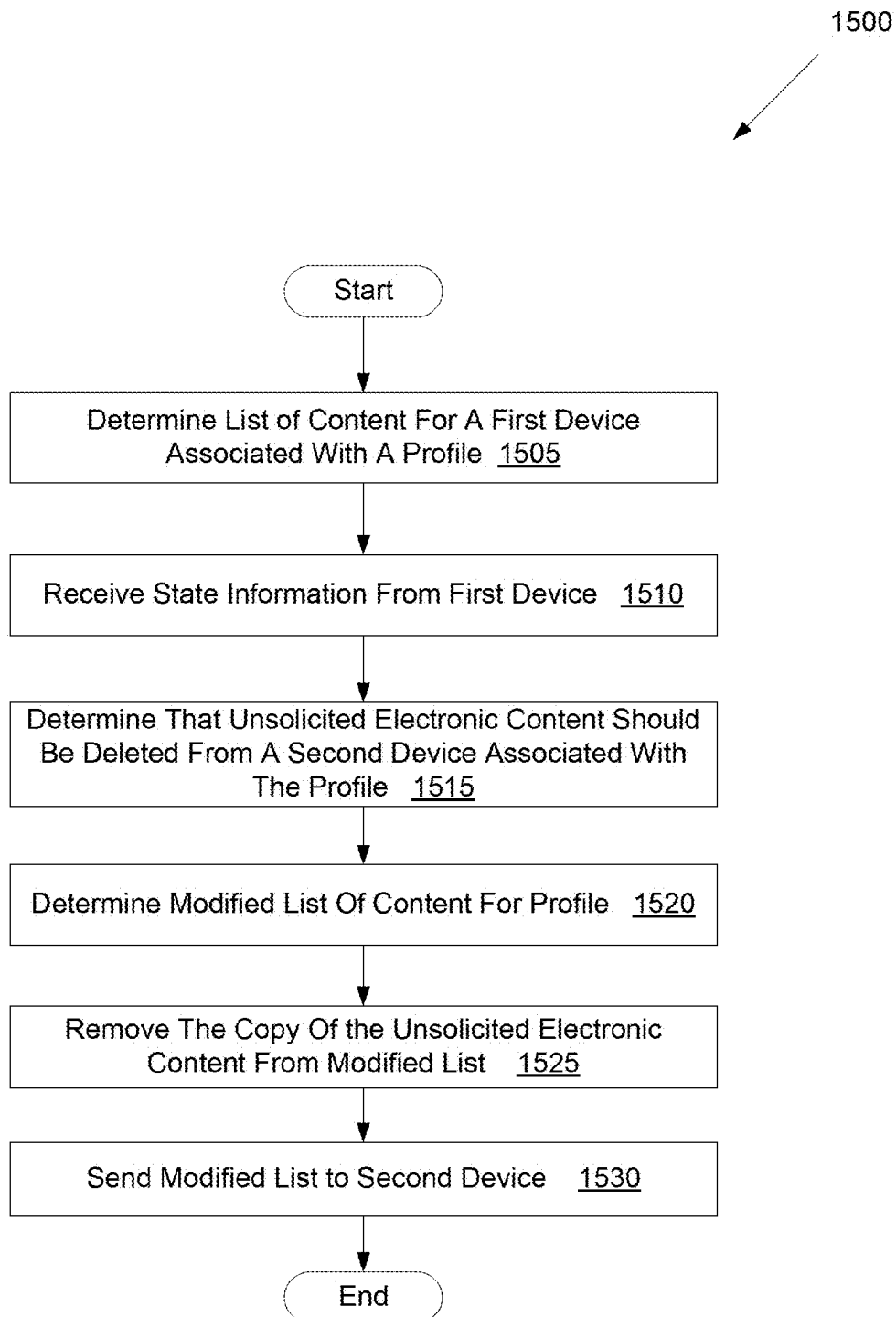
FIG. 15 is a flow diagram of an embodiment for a method of sending a notification to a second device responsive to activity on a first device.

FIG. 15 is a flow diagram of an embodiment for a method 1500 of sending a notification to a second device responsive to activity on a first device. At block 1505 of method 1500, processing logic determines a list of content for a first device associated with a profile. In some implementations, processing logic may determine the list for the first device in response to a request for content as described above with respect to request processor 405 of aggregator service 400 of FIG. 4. Alternatively, processing logic may determine the list in response to a request received from the first device to synchronize content stored on the first device with content stored on other devices associated with the profile as described above with respect to device synch module 425 of aggregator service 400 of FIG. 4. At block 1510, processing logic receives state information from the first device. In some implementations the state information indicates whether the content (e.g., both solicited and unsolicited electronic content) has been accessed by the profile on the device. In some implementations, the state information may be included in a synchronization request. Alternatively, the state information may have been previously received and stored in configuration data.

At block 1515, processing logic determines that unsolicited content should be deleted from a second device associated with the profile. In some implementations, processing logic may determine that the content should be deleted from the second device because the content on the second device is a copy of content has been accessed by or deleted from the first device. Alternatively, processing logic may determine that the content should be deleted because the number of content items associated with the profile across the first and second devices exceeds a predefined threshold value. At block 1520, processing logic determines a modified list of content for the profile. In some implementations, processing logic may determine the modified list of content by modifying the list of content for the first device to create a list of content for the profile using information describing the attributes of the second device (e.g., content currently stored on the device, available free space on the second device, etc.). In some implementations, this may be determined as described above with respect to list builder 415 of aggregator service 400 of FIG. 4. In some implementations, processing logic determines the modified list of content as described below with respect to FIG. 16.

At block 1525, processing logic removes the copy of the content from the modified list that should be deleted (e.g., the content identified at block 1515 that should be deleted from the second device). For example, once the new list of content has been determined at block 1520, processing logic may remove any content items identified at block 1515 then need to be deleted from the second device. The resulting modified list can indicate to the second device that any content item that is loaded on the device but no longer present on the modified list should be deleted from device storage. For example, processing logic may store entries of electronic content items in the list to stored unsolicited electronic content items. Stored unsolicited content items that are no longer on the list may then be deleted. In some implementations, this may be performed as described above with respect to server interaction module 327 of FIG. 3. Alternatively, processing logic may receive instructions to download and/or delete specific content items and/or to add or remove entries for content items from an already stored list. At block 1530, processing logic sends the modified list to the second device. In some implementations, this may be performed as described above with respect to response generator 420 of aggregator service 400 of FIG. 4. After block 1530, the method of FIG. 15 terminates.

Figure 16:
FIG. 16 is a flow diagram of an embodiment for a method of creating a modified list of content for a device.

FIG. 16 is a flow diagram of an embodiment for a method 1600 of creating a modified list of content for a device. At block 1605 of method 1600, processing logic receives a first list of content for a user profile from a first content source. For example, processing logic may receive a list of videos for the profile in a ranked order. The ranked order can be based on content preferences associated with the profile. For example, if the user prefers movies over television shows, the content preference associated with the user profile may cause the ranked order to be such that movies are ranked higher on the list than television shows. At block 1610, processing logic receives a second list of content from a second content source. For example, processing logic may receive a list of electronic books for the profile in a ranked order. The second list may be ranked in a similar fashion to the first list as noted above.

At block 1615, processing logic determines an amount of available free space on a device associated with the profile. In some implementations, processing logic determines the amount of available free space by first sending a request to the device for a report on the amount of available free space. Processing logic may then receive a response from the device that identifies the amount of available free space. In some implementations, processing logic may determine the amount of available free space on a device using other information received from the device. For example, processing logic may receive data identifying a total amount of free space on a device that includes the size of a storage component (e.g., device storage 330 of FIG. 3) minus an amount of content other than unsolicited content stored on the storage component. Processing logic may also receive data identifying a free space buffer threshold for a free space buffer on the storage component. Processing logic may also receive data identifying an amount of space on the storage component occupied by unsolicited content (e.g., the amount of space occupied by unsolicited content storage area 334 of FIG. 3). Processing logic may compute the available free space by subtracting the value of the free space buffer threshold and the amount of storage space occupied by the unsolicited content from the total amount of free space on the device.

At block 1620, processing logic identifies a content preference for the profile. In some implementations, the content preference indicates a content type most likely to be selected for the user profile based on past selections for the user profile. For example, in addition to the content preferences noted above, the user profile may have a content preference that indicates that the user prefers electronic books to videos.

At block 1625, processing logic creates a modified list by selecting at least one content item from the first list or the second list according to the content preference for the user profile, where the content type of the content item matches the identified content preference. Additionally, processing logic may account for the storage size of the content item. Depending on the amount of free space available on the device, processing logic may skip items from either list based on the size of the individual content items. For example, even though a user may prefer videos, processing logic may select a series of electronic books if the amount of free space is not sufficient to store a video file. Conversely, if even though a user may prefer electronic books, if there is a large amount of free space available on the device, processing logic may select videos along with electronic books for the modified list. In some implementations, the steps at blocks 1605-1625 may be performed as described above with respect to list builder 415 of aggregator service 400 of FIG. 4.

At block 1630, processing logic determines that the device is associated with a second user profile. In some implementations, the second user profile may be different from the user profile identified at block 1605, and associated with the same user account as the user profile identified at block 1605. A user account can include payment and shipping information for online retail purchases made in connection with the user profile and the second user profile. In some implementations, this may be performed as described above with respect to request processor 405 of aggregator service 400 of FIG. 4. At block 1635, processing logic determines an additional list of content for the second profile. At block 1640, processing logic selects at least one content item from the additional list created at block 1635. At block 1645, processing logic adds the at least one content item selected at block 1640 to the modified list created at block 1625. In some implementations, the steps at blocks 1634-1645 may be performed as described above with respect to list builder 415 of aggregator service 400 of FIG. 4. After block 1645, the method of FIG. 16 terminates.

Figure 17:
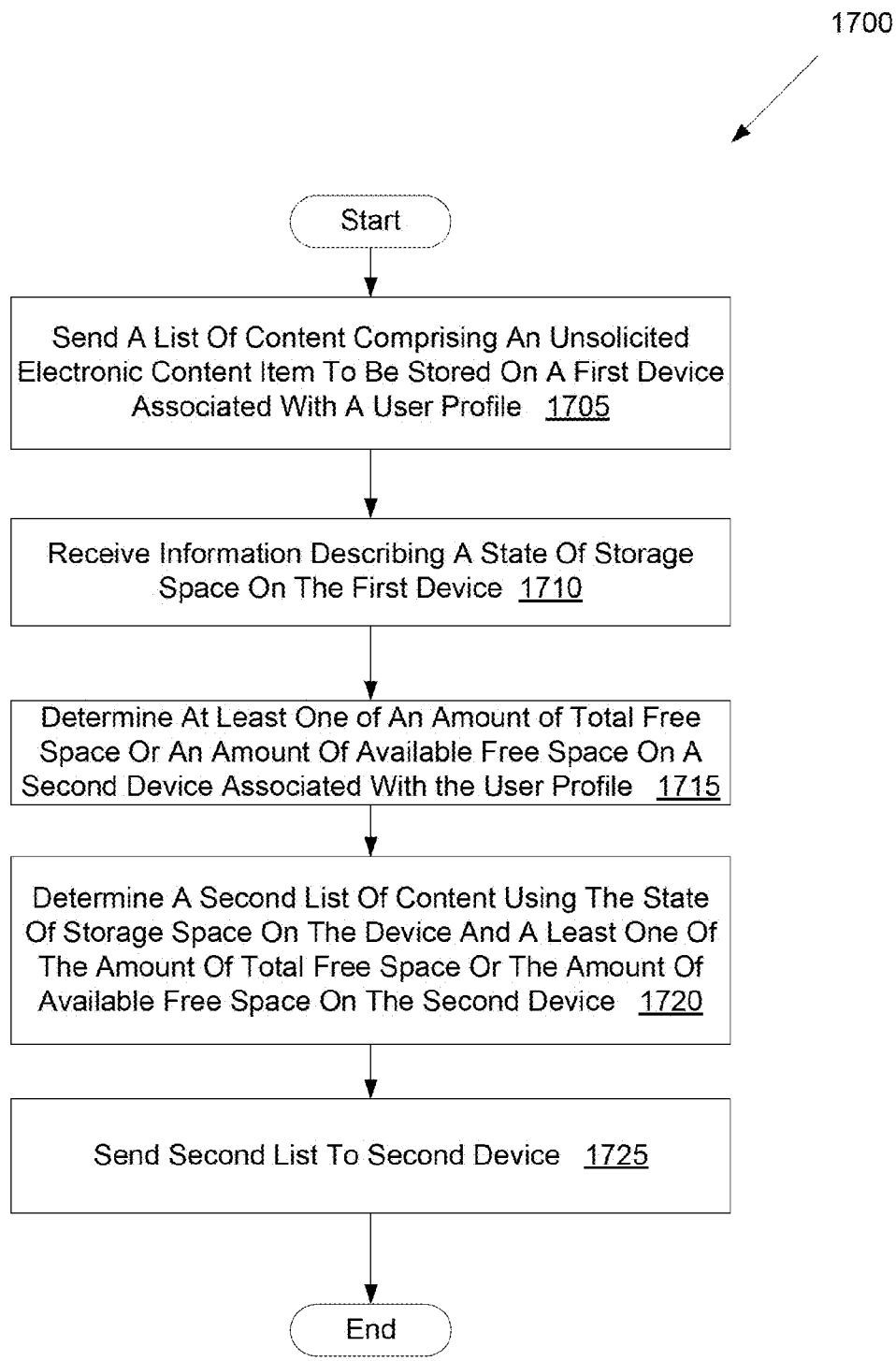
FIG. 17 is a flow diagram of an embodiment for a method of managing content for a profile stored across multiple devices.

FIG. 17 is a flow diagram of an embodiment for a method 1700 of managing content for a profile stored across multiple devices. At block 1705 of method 1700, processing logic sends a first list of content comprising an unsolicited content item to be stored on device first device associated with a user profile. The unsolicited content may be content that has been downloaded onto the device without first receiving a download request from the user profile or an application running on the device. In some implementations, this may be performed as described above with respect to aggregator service 400 of FIG. 4. At block 1710, processing logic receives information describing a state of storage space stored on the first device. The state of the storage space may include information identifying the content items downloaded into a storage component of the first device, the size of each content item on the first device, whether the content items on the first device have been accessed or deleted by the user profile, the amount of total free space and/or available free space remaining on the first device, etc.

At block 1715, processing logic determines a second state of content stored on a second device associated with the profile. The second state of the content may include information identifying the content items downloaded into device storage of the second device, the size of each content item on the second device, whether the content items on the second device have been accessed or deleted by the user, the amount of total free space and/or available free space remaining on the second device, etc.

At block 1720, processing logic determines a second list of content using the state of storage space on the first device and at least one of the total amount of free space on the second device or the available amount of free space on the second device. A content item that is larger than the available free space may not presently fit into the unsolicited content storage area, but may eventually fit into it as other unsolicited content items are removed therefrom. However, a content item that is smaller than a difference between a size of the available free space and a size of the free space buffer threshold may immediately fit into the unsolicited content storage area. At block 1725, processing logic sends the second list to the second device. In some implementations, this may be performed as described above with respect to trigger event processor 430 of aggregator service 400 of FIG. 4. After block 1730, the method of FIG. 17 terminates.

Figure 18:
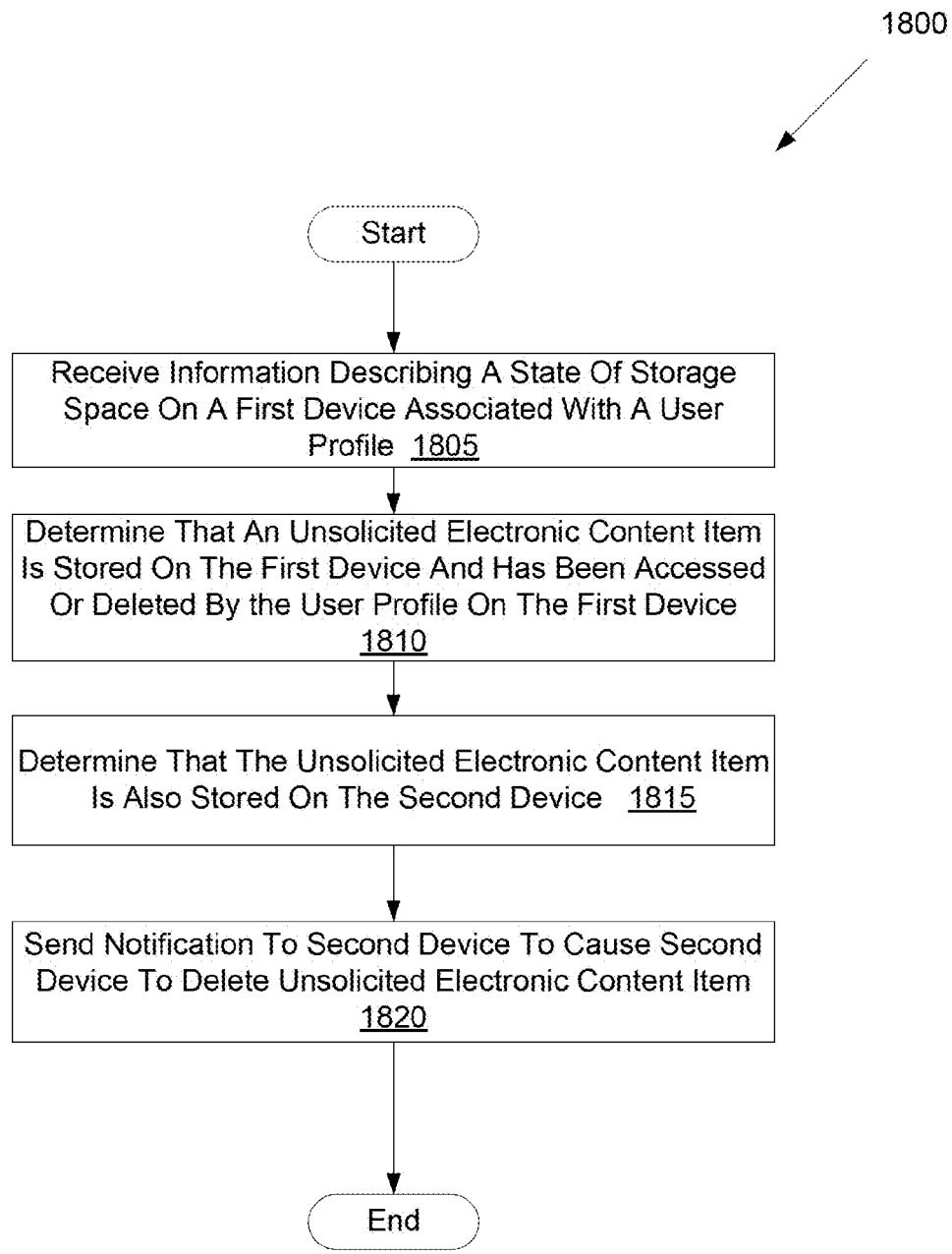
FIG. 18 is a flow diagram of an embodiment for a method of managing electronic content across multiple devices.

FIG. 18 is a flow diagram of an embodiment for a method 1800 of managing electronic content across multiple devices. At block 1805 of method 1800, processing logic receives information describing a state of storage space on a first device associated with a user profile. In some implementations the state information indicates whether electronic content (e.g., both solicited and unsolicited electronic content) has been accessed by the user profile on the first device. In some implementations, the state information may be included in a synchronization request received from a device. Alternatively, the state information may have been previously received and stored in configuration data. In some implementations, the state information may be received as described above with respect to device synch module 425 of aggregator service 400 of FIG. 4.

At block 1810, processing logic determines that an unsolicited content item is stored on the first device and has been accessed or deleted by the user profile on the first device. (e.g., a user may have viewed a portion of a video on the requesting mobile device). In some implementations, the state may be determined as described above with respect to device synch module 425 of aggregator service 400 of FIG. 4. At block 1815, processing logic determines that the unsolicited content item is also stored on the second device. In some implementations, this may be determined as described above with respect to profile manager 435 of aggregator service 400 of FIG. 4. At block 1820, processing logic sends a notification to the second device to cause the second device to delete the unsolicited electronic content item. In some implementations, processing logic may send the notification to the second device by transmitting an instruction to the device to delete the unsolicited electronic content item. Alternatively, processing logic may send the notification as a modified list of content that causes the second device to delete the unsolicited electronic content item with other electronic content items included in the modified list. In some implementations, this may be performed as described above with respect to trigger event processor 430 of FIG. 4. After block 1820, the method of FIG. 18 terminates.

Figure 19:
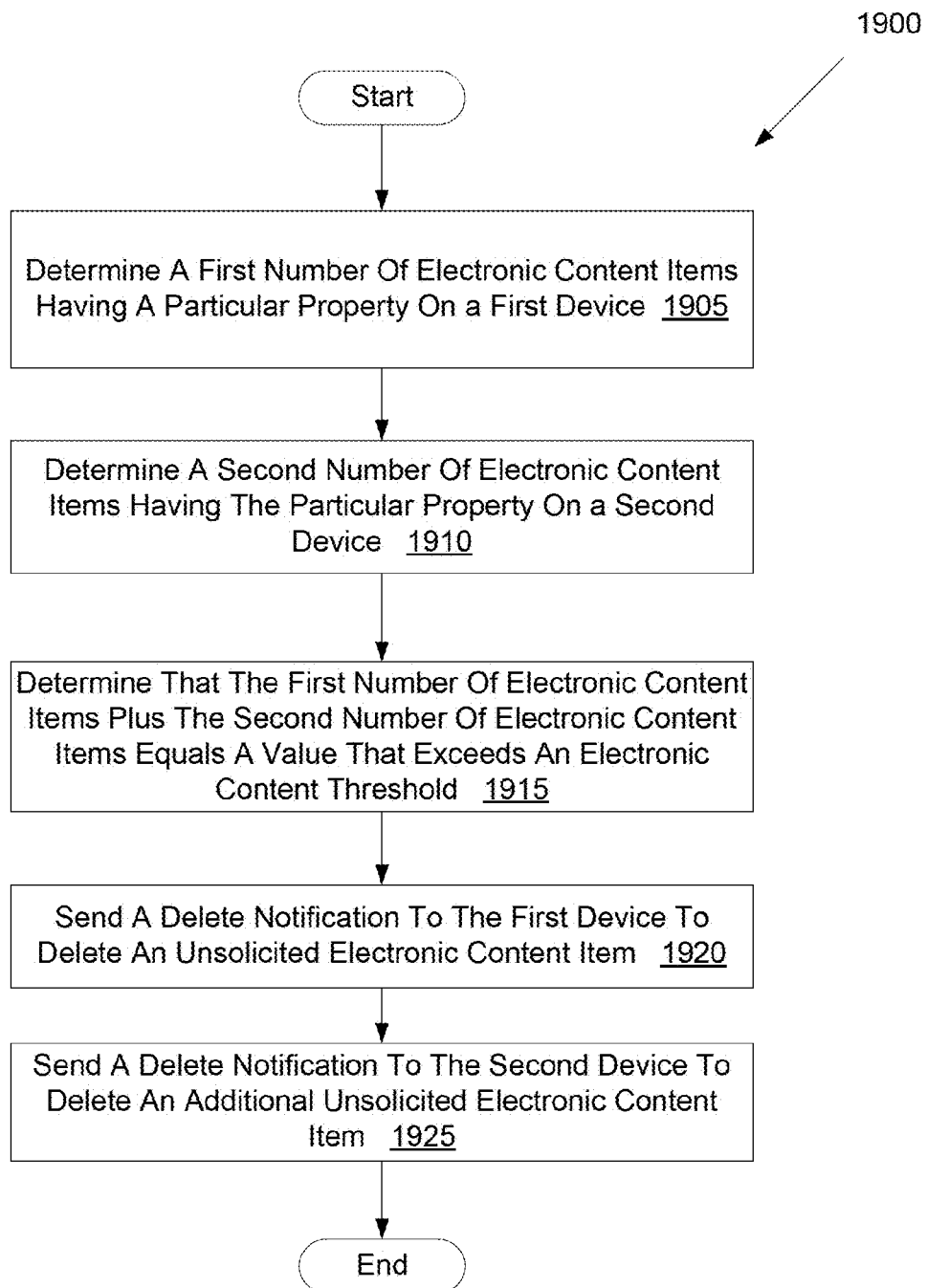
FIG. 19 is a flow diagram of an embodiment for a method of causing unsolicited electronic content to be deleted from multiple devices.

FIG. 19 is a flow diagram of an embodiment for a method 1900 of deleting unsolicited content from multiple devices. At block 1905 of method 1900, processing logic determines a number of electronic content items having a particular property on a first device associated with a user profile. For example, processing logic may determine the total number of videos that are stored on the device. The number of electronic content items can include solicited electronic content (e.g., electronic content items that have been downloaded to the device in response to a request from a user) or unsolicited content (e.g., electronic content items speculatively downloaded for the profile associated with the device). At block 1910, processing logic determines a second number of electronic content items having the particular property on a second device associated with the profile. The second number of electronic content items can include solicited electronic content (e.g., electronic content items that have been downloaded to the second device in response to a request from a user) or unsolicited content (e.g., electronic content items speculatively downloaded for the profile associated with the second device). At block 1915, processing logic determines that the first number of electronic content items plus the second number of electronic content items equals a value that exceeds an electronic content threshold. For example, processing logic may determine that 20 videos have been downloaded across the two devices. If the maximum number of videos that a user may maintain across multiple devices is 19, and the user has downloaded 20, the threshold has been exceeded. In some implementations, blocks 1905-1915 may be performed as described above with respect to aggregator service 400 of FIG. 4.

At block 1920, processing logic sends a delete notification to the first device associated with the profile to delete an unsolicited content item stored on that device. At block 1925, processing logic sends a second delete notification to the second device associated with the profile to delete an additional unsolicited content item stored on that device. In some implementations, the steps at blocks 1920-1925 may be performed as described above with respect to trigger event processor 435 of aggregator service 400 of FIG. 4.

Figure 20:
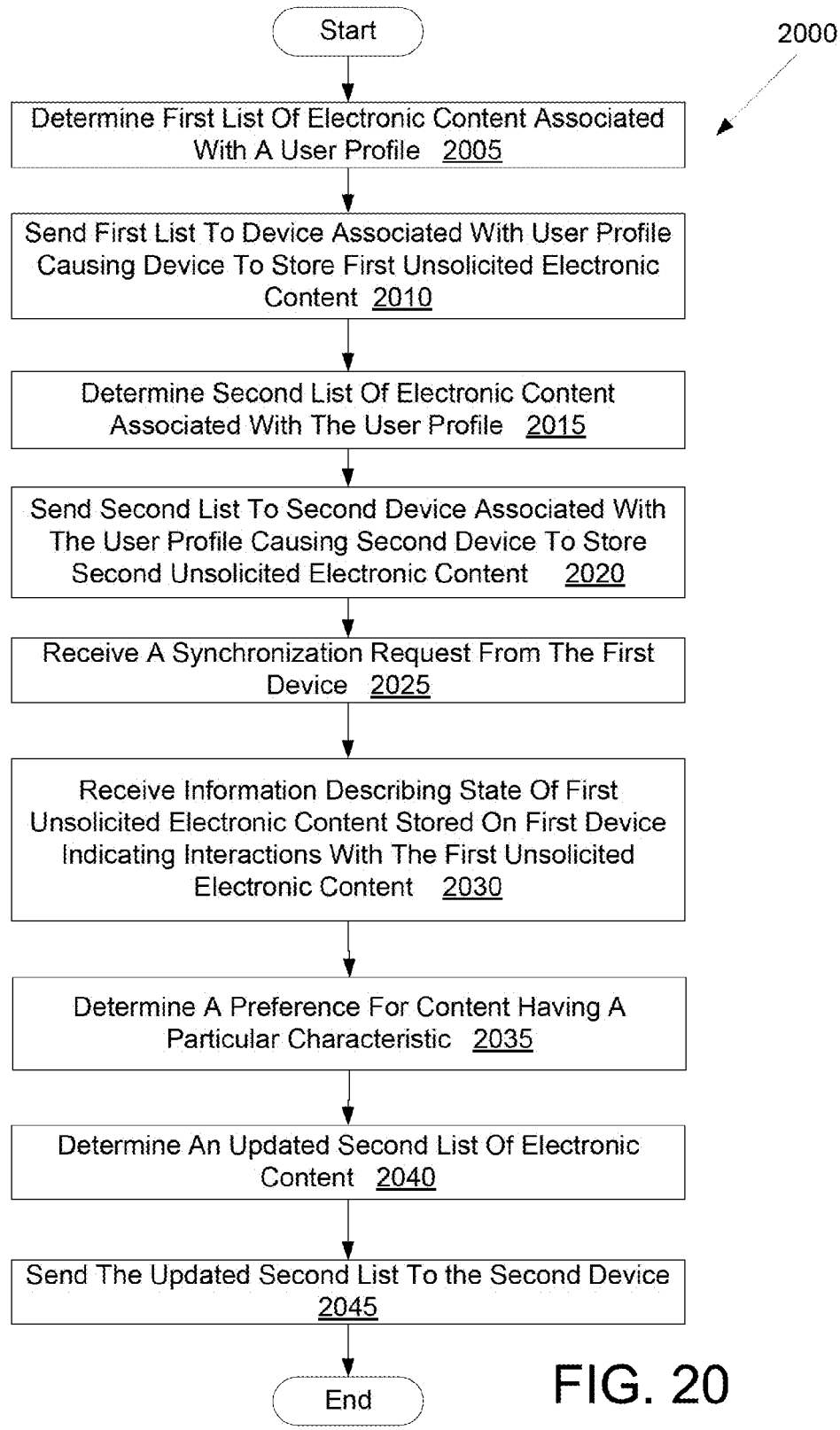
FIG. 20 is a flow diagram of an embodiment for a method of managing unsolicited content on multiple devices.

FIG. 20 is a flow diagram of an embodiment for a method 2000 for managing unsolicited electronic content on multiple devices. At block 2005 of method 2000, processing logic determines a first list of electronic content associated with a user profile. In some implementations, the first list of electronic content may include a list of movies for a particular user profile based on a set of preferences associated with the user profile (e.g., based on prior electronic content purchases, prior electronic content viewings, etc.).

At block 2010, processing logic sends the first list to a device associated with the user profile. In some implementations the list may cause the device to store a first unsolicited electronic content from the first list. For example, processing logic may send the list of content to a television set top device associated with the user profile, causing the set top box to store data representing a digital movie identified in the list of content.

At block 2015, processing logic determines a second list of electronic content associated with the user profile. In some implementations, the second list may include a different type of electronic content than the first list. For example, the second list may include a list of electronic books for the user profile based on the set of preferences associated with the user profile.

At block 2020, processing logic sends the second list to a second device associated with the user profile. In some implementations, the list may cause the second device to store a second unsolicited electronic content from the second list. For example, processing logic may send the second list to a tablet computer associated with the user profile, causing the tablet computer to store data representing an electronic book identified in the second list of electronic content.

At block 2025, processing logic receives a synchronization request from the first device. In some implementations, the synchronization request can include a request to synchronize the unsolicited electronic content stored on the first device with the first list. For example, the synchronization request may be a request to synchronize unsolicited electronic content on a television set top device with the list of movies for the user profile.

At block 2030, processing logic receives information describing the state of the first unsolicited electronic content from the first list that is stored on the first device, where the information indicates interactions with the first unsolicited electronic content. For example, the information may indicate whether the first unsolicited digital content has been accessed by the user profile on the first device. For example, processing logic may receive information describing the state of an unsolicited video item stored on the television set top device that indicates whether the video has been accessed by the user profile on the television set top device. At block 2035, processing logic determines, using the information received at block 2030, a preference for content having a particular characteristic. The particular characteristic may be a genre (e.g., science fiction, fantasy, non-fiction, mystery, etc.), a length, an author, an actor, a year of release, a depicted time period, a subject, a content type, and so on. For example, processing logic can determine that a user profile may demonstrate a preference for video content after having viewed a video item stored on the set top device. In another example, processing logic may determine that a user profile frequently accesses titles (e.g., movies, TV shows, books, etc.) corresponding to a specific genre.

At block 2040, processing logic determines an updated second list of electronic content. In some implementations, the updated second list of electronic content may be determined by increasing a ranking associated with one or more of the electronic content items from the second list that have the particular characteristic from block 2035. For example, the rank of each video item in the second list may be increased to determine the updated second list. In another example, the ranks of all content items corresponding to a particular genre may have their ranks increased regardless of content type. At block 2045, processing logic sends the updated second list of electronic content to the second device. For example, the updated second list may be sent to the tablet computer. After block 2045, the method of FIG. 20 terminates.

Figure 21:
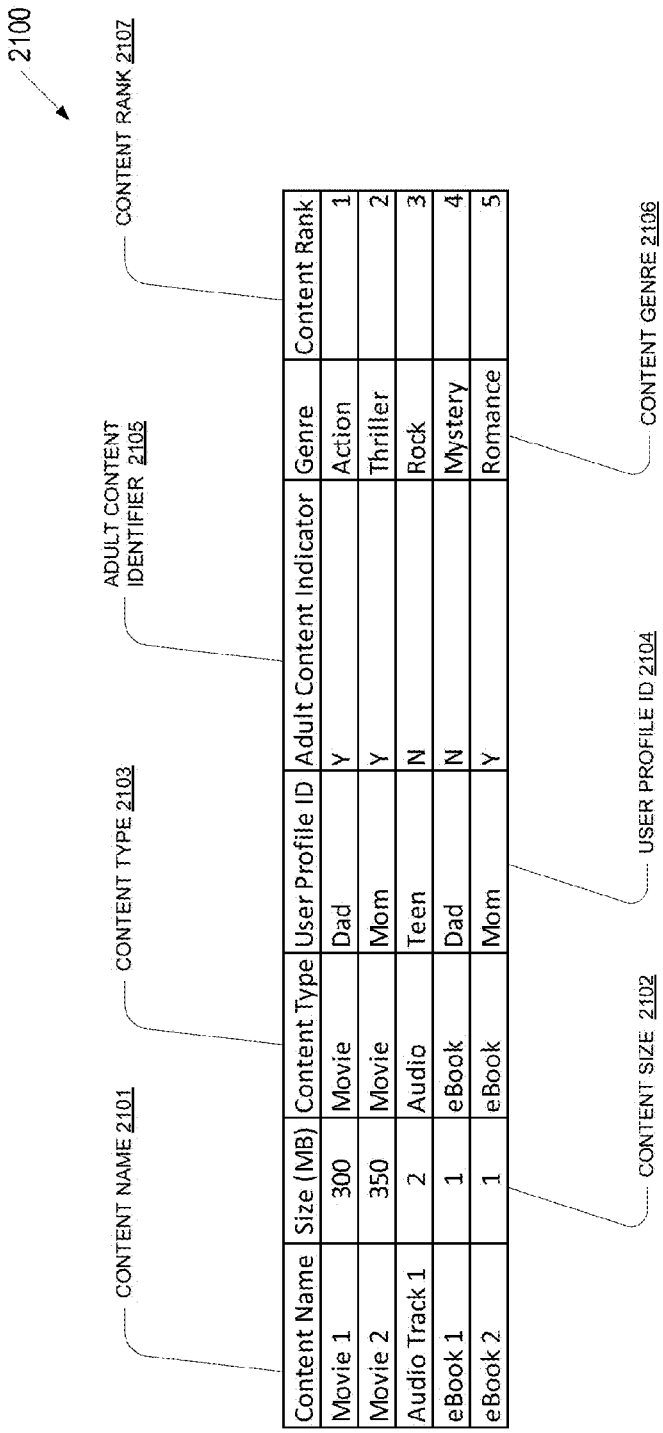
FIG. 21 is a diagram of an embodiment of a list of electronic content for multiple profiles associated with a device.

FIG. 21 is a diagram of an embodiment of a list 2100 of electronic content for multiple profiles associated with a device. While, for simplicity, the list of electronic content is presented in FIG. 21 as a table data structure containing particular data items, various embodiments can maintain the list of electronic content in other types of data structures and containing other data items. List 2100 illustrates an example list of content associated with multiple profiles for a device capable of presenting video content, audio content, and electronic books (e.g., a tablet computer). In an alternative embodiment, a list associated with a device only capable of displaying video content (e.g., a television set top device) may only include video and audio content items. Each device associated with a user profile (or set of user profiles associated with a user account) may be associated with a unique list 2100.

Content name 2101 can include an identifier for the electronic content item, such as the title of a movie, the title of a book, a serial number, an inventory number etc. Content size 2102 can represent the size (e.g., in megabytes) of the data content corresponding electronic content item. Content type 2103 can represent the type of electronic content associated with the content item, such as audio, video, etc. User profile ID 2104 can include the user profile identifier associated with the content item. In some implementations, each content item in the list may be associated with the same profile, and thus have the same value for User profile ID 2104. Alternatively, the list 2100 may be constructed for all user profiles associated with a single device, as illustrated in FIG. 21. For example, three user profiles (Dad, Mom, and Teen) may be associated with a tablet computer device. Thus, a list 2100 for the shared tablet computer device can include items for Dad, Mom, and Teen.

Adult content identifier 2105 can represent an indicator that signifies whether the associated electronic content item may be accessible to a user profile that is not an adult profile. For example, user Teen may not be able to obtain access to Movie 1 or Movie 2 which have set as adult content. Content genre 2106 can represent a category associated with the corresponding content item. Content rank 2107 can represent the ranking associated with the corresponding content item as determined according to a set of preferences associated with the user profiles. For example, if the associated user profiles have preferences for movies over electronic books, movie content items may have a higher priority rank than electronic books.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "determining", "identifying", "sending", "removing", "selecting", "adding", "multiplying", "setting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention relate to an apparatus for performing the operations herein. This apparatus may be specially constructed for the disclosed purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory media suitable for storing electronic instructions (e.g., media other than a carrier wave).

The algorithms and displays presented herein are not inherently related to any particular computer or other apparatus. Various general purpose systems may be used with programs in accordance with the teachings herein, or it may prove convenient to construct a more specialized apparatus to perform the required method steps. The structure for a variety of these systems will appear from the description above. In addition, embodiments of the present invention are not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   determining, by a device, a minimum write speed associated with a storage component of the device;
   determining a minimum free space buffer threshold associated with the storage component from configuration data;
   determining a low storage threshold for the storage component of the device from a setting of an operating system of the device;
   determining a write speed associated with the storage component, wherein determining the write speed comprises determining a larger of the minimum write speed and an observed write speed over a past time period;
   determining a time interval at which the device determines a total amount of free storage space on the storage component;
   multiplying the write speed by the time interval to determine a predicted storage space usage of the storage device in a future time period that corresponds to the time interval;
   determining, by the device, a first value for a variable free space buffer threshold for a free space buffer of the device to be equal to the low storage threshold plus a larger of the minimum free space buffer threshold and the predicted storage space usage, wherein the free space buffer corresponds to a first area of the storage component; and
   determining a size for an unsolicited content storage area on the storage component to be equal to the total amount of free storage space minus the first value for the variable free space buffer threshold, wherein the unsolicited content storage area corresponds to a second area of the storage component that is to be used for storage of unsolicited content.

2. The method of claim 1, further comprising:
   determining that solicited content is added to the free space buffer on the storage component at a first rate, wherein the first rate comprises a first amount of data that is written in an instance of the time interval;
   determining that deletion of the unsolicited content from the unsolicited content storage area is performed at a second rate, wherein the second rate comprises a second amount of data that is deleted in the instance of the time interval;
   determining that the first rate is higher than the second rate by a rate delta;
   determining a delta amount of storage space associated with the rate delta;
   determining a second value for the variable free space buffer threshold that is larger than the first value for the variable free space buffer threshold by at least the delta amount of storage space; and
   determining a new size for the unsolicited content storage area that is smaller than the size.

3. The method of claim 1, further comprising:
   determining a download speed associated with a network connection of the device;
   determining a delete speed associated with the storage component based on a storage type of the storage component, the delete speed comprising a rate at which the unsolicited content can be deleted from the unsolicited content storage area;
   determining that the delete speed is faster than the download speed; and
   storing the first value for the variable free space buffer threshold.

4. The method of claim 1, further comprising:
after an additional time period, determining a new observed write speed associated with the storage component, wherein determining the new observed write speed comprises:
  determining a recent write speed for a most recent instance of the time interval;
  generating a reduced observed write speed by applying a weight of less than one to the observed write speed; and
  determining the new observed write speed to be a larger of the reduced observed write speed and the recent write speed;
multiplying the new observed write speed by the time interval to determine a new predicted storage space usage of the storage component; and
setting a new value for the variable free space buffer threshold for the free space buffer to be equal to the low storage threshold plus the new predicted storage space usage, wherein the new value for the variable free space buffer threshold is different from the first value for the variable free space buffer threshold.

5. A method comprising:
determining, by a processing device, configuration data associated with a device;
analyzing the configuration data with respect to storage usage data collected over a previous time period;
determining a maximum amount of storage space of a storage component for the device that is predicted to be written to in a future time period; and
determining, by the processing device, a first value for a variable free space buffer threshold for a free space buffer of the storage component to be greater than the maximum amount of storage space that is predicted to be written to in the future time period.

6. The method of claim 5, wherein determining the configuration data comprises determining a low storage threshold for the storage component, the method further comprising:
determining the first value for the variable free space buffer threshold to be at least the maximum amount of storage space that is predicted to be written to in the future time period plus the low storage threshold, wherein the free space buffer corresponds to an area of the storage component.

7. The method of claim 5, further comprising:
determining a total amount of free storage space for the storage component; and
setting a size for an unsolicited content storage area of the storage component to be at least the total amount of free storage space minus the first value for the variable free space buffer threshold, wherein the unsolicited content storage area corresponds to an area of the storage component that is to be used for storage of unsolicited content.

8. The method of claim 7, further comprising:
determining a write speed associated with the storage component, wherein the write speed comprises a larger of a minimum write speed and an observed write speed over the past time period;
determining a delete speed associated with the storage component; and
determining, using the write speed and the delete speed, whether data can be deleted from the unsolicited content storage area faster than the free space buffer can be filled.

9. The method of claim 5, further comprising:
identifying an application running on the device;
determining a historical storage space utilization associated with the application; and
determining a new value for the variable free space buffer threshold in accordance with the historical storage space utilization.

10. The method of claim 5, further comprising:
determining a minimum write speed associated with the storage component;
determining an observed write speed associated with the storage component;
determining a larger of the minimum write speed or the observed write speed to be a maximum write speed in the future time period;
determining a time interval at which the device determines a total amount of free storage space on the storage component; and
multiplying the maximum write speed by the time interval to determine the maximum amount of storage space of the storage component that is predicted to be written to in the future time period.

11. The method of claim 10, further comprising:
after an instance of the time interval, determining a new observed write speed associated with the storage component, wherein determining the new observed write speed comprises:
  determining a recent write speed over the additional instance of the time interval;
  generating a reduced observed write speed by applying a weight of less than one to the observed write speed; and
  determining the new observed write speed to be a larger of the reduced observed write speed and the recent write speed.

12. The method of claim 11, further comprising:
multiplying the new observed write speed by the time interval to determine a new predicted storage space usage of the device; and
determining a new value for the variable free space buffer threshold for the free space buffer to be greater than the new predicted storage space usage, wherein the new value for the variable free space buffer threshold is different from the first value for the variable free space buffer threshold.

13. The method of claim 5, further comprising:
determining a storage space usage of the storage component over a new time period, the storage space usage comprising writes to the storage component and deletions from the storage component;
determining that the storage space usage of the storage component causes an amount of free space on the storage component to fall below the first value for the variable free space buffer threshold; and
determining a second value for the variable free space buffer threshold that is larger than the first value for the variable free space buffer threshold.

14. The method of claim 5, further comprising:
determining a storage space usage of the storage component over a new time period, the storage space usage comprising writes to the storage component and deletions from the storage component;
determining that the storage space usage of the device causes the amount of free space on the device to exceed the first value for the variable free space buffer threshold; and determining a second value for the variable free space buffer threshold that is smaller than the first value for the variable free space buffer threshold.

15. The method of claim 5, further comprising:

determining a download speed associated with a network connection of the device;

determining a delete speed associated with the storage component; and storing the first value for the variable free space buffer threshold.

16. A device, comprising:

a storage component;

a memory to store instructions; and a processing device, operatively coupled to the memory and to the storage component, to execute the instructions, wherein the processing device is to:

determine configuration data associated with the device;

analyze the configuration data with respect to storage usage data collected over a previous time period;

determine a maximum amount of storage space of the storage component that is predicted to be written to in a future time period; and determine a first value for a variable free space buffer threshold for a free space buffer of the storage component to be greater than the maximum amount of storage space that is predicted to be written to in the future time period.

17. The device of claim 16, wherein to determine the configuration data the processing device is to determine a low storage threshold for the storage component, and wherein the processing device is further to:

determine the first value for the variable free space buffer threshold to be at least the maximum amount of storage space that is predicted to be written to in the future time period plus the low storage threshold, wherein the free space buffer corresponds to an area of the storage component.

18. The device of claim 16, wherein the processing device is further to:

determine a total amount of free storage space for the storage component; and set a size for an unsolicited content storage area of the storage component to be at least the total amount of free storage space minus the first value for the variable free space buffer threshold, wherein the unsolicited content storage area corresponds to an area of the storage component that is to be used for storage of unsolicited content.

19. The mobile computing device of claim 16, wherein the processing device is further to:

determine a minimum write speed associated with the storage component;

determine an observed write speed associated with the storage component;

determine a larger of the minimum write speed or the observed write speed to be a maximum write speed in the future time period;

determine a time interval at which the device checks a total amount of free storage space on the storage component; and multiply the maximum write speed by the time interval to determine the maximum amount of storage space of the storage component to be written to in the future time period.

20. The mobile computing device of claim 16, wherein the processing device is further to:

determine a storage space usage of the storage component over a new time period, the storage space usage comprising writes to the storage component and deletions from the storage component;

determine that the storage space usage of the storage component causes an amount of free space on the storage component to fall below the first value for the variable free space buffer threshold; and determine a second value for the variable free space buffer threshold that is larger than the first value for the variable free space buffer threshold.

* * * * *